(12) United States Patent
Bartucci et al.

(10) Patent No.: US 12,167,293 B2
(45) Date of Patent: Dec. 10, 2024

(54) SYSTEMS AND METHODS FOR DYNAMICALLY DELIVERING ACCESS CREDENTIALS FOR LOCKING SYSTEMS

(71) Applicant: Master Lock Company LLC, Oak Creek, WI (US)

(72) Inventors: John Bartucci, Oak Creek, WI (US); Kevin Anderson, Oak Creek, WI (US); Brad Banach, Oak Creek, WI (US); Greg Miller, Oak Creek, WI (US)

(73) Assignee: Master Lock Company LLC, Oak Creek, WI (US)

( * ) Notice: Subject to any disclaimer, the term of this patent is extended or adjusted under 35 U.S.C. 154(b) by 495 days.

(21) Appl. No.: 17/698,580

(22) Filed: Mar. 18, 2022

(65) Prior Publication Data

US 2022/0210604 A1 Jun. 30, 2022

Related U.S. Application Data

(63) Continuation of application No. 17/018,902, filed on Sep. 11, 2020, now Pat. No. 11,304,027, which is a
(Continued)

(51) Int. Cl.
*H04W 4/021* (2018.01)
*H04L 67/52* (2022.01)
(Continued)

(52) U.S. Cl.
CPC .............. *H04W 4/021* (2013.01); *H04L 67/52* (2022.05); *H04W 4/023* (2013.01); *H04W 4/029* (2018.02); *H04W 64/003* (2013.01)

(58) Field of Classification Search
CPC ........... G06Q 20/3224; G06Q 20/3223; G06Q 20/3278; G06Q 20/20; G06Q 20/4014
(Continued)

(56) References Cited

U.S. PATENT DOCUMENTS

| 9,600,949 B2 | 3/2017 | Conrad et al. |
| 9,652,917 B2 | 5/2017 | Johnson et al. |

(Continued)

FOREIGN PATENT DOCUMENTS

| CN | 107909685 A | 4/2018 |
| KR | 101599055 B1 | 3/2016 |

(Continued)

OTHER PUBLICATIONS

Foreign Action other than Search Report on PCT PCT/US2020/021524 dated Sep. 23, 2021.
(Continued)

*Primary Examiner* — David Q Nguyen
(74) *Attorney, Agent, or Firm* — Foley & Lardner LLP

(57) ABSTRACT

A lock system includes a processing circuit. The processing circuit is configured to store an access credential for a locking device. The access credential is associated with a user. The access credential has a lifespan. The processing circuit is further configured to deliver the access credential to a user device associated with the user to facilitate accessing the locking device with the user device, monitor a frequency at which the user device accesses the locking device using the access credential, and adjust the lifespan of the access credential based on the frequency.

14 Claims, 17 Drawing Sheets

Related U.S. Application Data continuation of application No. 16/811,936, filed on Mar. 6, 2020, now Pat. No. 10,779,115.

(60) Provisional application No. 62/815,733, filed on Mar. 8, 2019.

(51) Int. Cl.
*H04W 4/02* (2018.01)
*H04W 4/029* (2018.01)
*H04W 64/00* (2009.01)

(58) Field of Classification Search
USPC .................. 455/456.3, 456.2, 410, 411
See application file for complete search history.

(56) References Cited

U.S. PATENT DOCUMENTS

| | | | |
|---|---|---|---|
| 9,691,198 B2 | 6/2017 | Cheng et al. | |
| 9,894,066 B2 | 2/2018 | Conrad | |
| 9,916,742 B2 | 3/2018 | Kuenzi | |
| 9,996,999 B2 | 6/2018 | Conrad et al. | |
| 10,074,224 B2 | 9/2018 | Ho et al. | |
| 10,164,957 B1 | 12/2018 | Saylor et al. | |
| 10,205,913 B2 | 2/2019 | Smith et al. | |
| 2009/0144095 A1* | 6/2009 | Shahi | G06Q 10/0635 |
| | | | 700/92 |
| 2011/0088086 A1* | 4/2011 | Swink | G06F 3/0488 |
| | | | 715/764 |
| 2013/0060689 A1* | 3/2013 | Oskolkov | G06Q 20/10 |
| | | | 705/42 |
| 2015/0235496 A1 | 8/2015 | Vecchiotti et al. | |
| 2016/0217637 A1 | 7/2016 | Gengler et al. | |
| 2016/0335595 A1 | 11/2016 | Levy et al. | |
| 2017/0103595 A1 | 4/2017 | Taylor et al. | |
| 2017/0154483 A1 | 6/2017 | Cordiner et al. | |
| 2018/0160260 A1 | 6/2018 | Meganathan | |
| 2018/0240293 A1 | 8/2018 | Fares et al. | |
| 2018/0357848 A1 | 12/2018 | McLellan et al. | |
| 2019/0035181 A1 | 1/2019 | Musabeyoglu et al. | |
| 2019/0075112 A1 | 3/2019 | Neafsey et al. | |
| 2020/0258335 A1 | 8/2020 | Davis | |
| 2020/0349786 A1 | 11/2020 | Ho et al. | |

FOREIGN PATENT DOCUMENTS

| | | | | |
|---|---|---|---|---|
| WO | WO-2011091038 A3 * | 11/2011 | ......... | G07C 9/00158 |
| WO | WO-2012034250 A1 * | 3/2012 | ............ | G06F 21/34 |
| WO | WO-2017/039404 A2 | 3/2017 | | |

OTHER PUBLICATIONS

International Search Report and Written Opinion, PCT/US2020/021524, Master Lock Company LLC (May 21, 2020).
Notice of Allowance on U.S. Appl. No. 16/811,936 dated May 12, 2020.
US Notice of Allowance on U.S. Appl. No. 17/018,902 DTD Dec. 8, 2021.
Foreign Action other than Search Report on EP DTD Nov. 7, 2022.

* cited by examiner

SYSTEMS AND METHODS FOR DYNAMICALLY DELIVERING ACCESS CREDENTIALS FOR LOCKING SYSTEMS

CROSS-REFERENCE TO RELATED PATENT APPLICATIONS

This application is a continuation of U.S. patent application Ser. No. 17/018,902, filed Sep. 11, 2020, which is a continuation of U.S. patent application Ser. No. 16/811,936, filed Mar. 6, 2020, which claims the benefit of U.S. Provisional Patent Application No. 62/815,733, filed Mar. 8, 2019, all of which are incorporated herein by reference in their entireties.

BACKGROUND

Electronic locks may be accessed (e.g., unlocked, have settings altered, etc.) using a user's personal device (e.g., a smartphone). Typically, the user's personal device and a respective electronic lock will interact with each other such that an access decision can be made by the phone and/or the electronic lock (e.g., based on access rights). As electronic locks become more mainstream, the number of electronic locks a company or individual owns has increased substantially. Managing the access rights to such high quantities of electronic locks on each user's personal device can become unwieldy and consume significant storage space on each user's personal device, as well as increase the vulnerability of a security system in the event that one of the user's personal device becomes compromised (e.g., stolen, hacked, etc.) with the access rights to hundreds of electronic locks stored thereon.

SUMMARY

One embodiment relates to a method for dynamically delivering access credentials. The method includes storing, by a server, a plurality of access credentials; receiving, by the server, a plurality of geofence settings regarding geofences for a plurality of user devices used during a geofence delivery protocol; receiving, by the server, lock location data regarding a location of each of a plurality of locking devices; receiving, by the server, first user device location data from a respective user device of the plurality of user devices regarding a first location of the respective user device; determining, by the server, a first lock subset of the plurality of locking devices that is within a geofence based on the lock location data and the first user device location data; delivering, by the server, a first credential subset of the plurality of access credentials to the respective user device where the first credential subset (i) is associated with the respective user device and (ii) corresponds with the first lock subset; receiving, by the server, second user device location data from the respective user device regarding a second location of the respective user device; determining, by the server, a second lock subset of the plurality of locking devices that is within the geofence based on the lock location data and the second user device location data; and delivering, by the server, a second credential subset of the plurality of access credentials to the respective user device where the second credential subset (i) is associated with the respective user device and (ii) corresponds with the second lock subset within the geofence.

Another embodiment relates to a method for dynamic access credential delivery. The method includes storing, by a server, access credentials; receiving, by the server, a plurality of geofence settings regarding a plurality of geofences for a plurality of user devices; receiving, by the server, lock location data regarding a location of each of a plurality of locking devices; receiving, by the server, user device location data regarding a current location of each of the plurality of user devices; performing, by the server, a geofence delivery protocol for delivering the access credentials to the plurality of user devices; monitoring, by the server, a current aggregate loading on the server using the geofence delivery protocol; and transitioning, by the server, from the geofence delivery protocol to a non-geofence delivery protocol for delivering the access credentials to at least one of the plurality of user devices in response to the current aggregate loading exceeding a load threshold to reduce the current aggregate loading on the server. For each of the plurality of user devices, the geofence delivery protocol includes determining a lock subset of the plurality of locking devices that (i) is within a geofence of the plurality of geofences of a user device of the plurality of user devices based on the lock location data and the user device location data and (ii) is accessible by a user of the user device; determining a credential subset of the access credentials that is associated with the lock subset; and delivering the credential subset to the user device.

Still another embodiment relates to a lock system. The lock system includes a plurality of electronic locking devices and a server. The server is configured to receive lock location data regarding a location of each of the plurality of electronic locking devices, receive user device location data regarding a current location of each of a plurality of user devices, deliver access credentials to each of the plurality of user devices according to a geofence delivery protocol based on the lock location data and the user device location data, monitor a current aggregate loading in response to using the geofence delivery protocol, and deliver access credentials to one or more of the plurality of user devices according to a non-geofence delivery protocol in response to the current aggregate loading exceeding a load threshold to reduce the current aggregate loading. At least one of the plurality of electronic locking devices is disconnected from and unable to directly communicate with the server. The at least one of the plurality of electronic locking devices is configured to receive a respective access credential from a respective user device and decide to initiate an access control session with the respective user device independent of the server based on the respective access credential received from the respective user device.

Still another embodiment relates to a method for dynamically receiving access credentials. The method includes transmitting, by a mobile user device to a server, first user device location data regarding a first location of the mobile user device, where the server stores a geofence associated with the mobile user device, a plurality of access credentials associated with the mobile user device, and a last known location or a current location of each of a plurality of locking devices; receiving, by the mobile user device from the server, a first credential subset of the plurality of access credentials based on the geofence, the first user device location data, and the last known location or the current location of each of the plurality of locking devices; transmitting, by the mobile user device to the server, second user device location data regarding a second location of the mobile user device; and receiving, by the mobile user device from the server, a second credential subset of the plurality of access credentials based on the geofence, the second user device location data, and the last known location or the current location of each of the plurality of locking devices.

In some embodiments, the method includes receiving, by the mobile user device from the server, one or more of the plurality access credentials according to a non-geofence delivery protocol in response to a current aggregate loading on the server exceeding a load threshold to reduce the current aggregate loading on the server.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As utilized herein, the term "disconnected device" means a device that is incapable of communicating directly with a server, but rather requires an intermediary device (e.g., a smartphone, etc.) in short-range communication with the disconnected device to facilitate the transmission of data between the disconnected device and the sever. As utilized herein, the term "connected device" means a device that is capable of communicating directly with a server (e.g., using a long-range communication protocol, cellular, radio, Wi-Fi, etc.) without the need of such an intermediary device (excluding a router/modem of a Wi-Fi architecture). As utilized herein, the term "key" (e.g., lock key, user key, cryptographic key, etc.) means a numeric or alphanumeric code, which, for example, may be a parameter used in a block cipher algorithm that determines a forward cipher function. As utilized herein, the term "nonce" (e.g., handshake nonce, reply nonce, modified reply nonce, etc.) means a value that is used only once within a specified context.

System Overview

Figure 1:
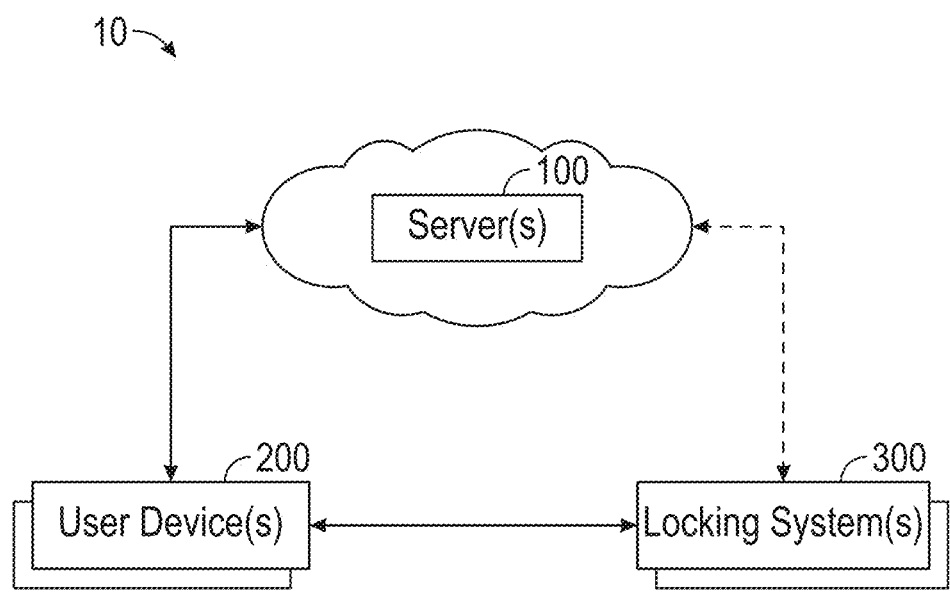
FIG. 1 is a block diagram of a system for wireless user profile management between one or more servers, one or more user devices, and/or one or more locking systems, according to an exemplary embodiment.

According to the exemplary embodiment shown in FIGS. 1-12, an access credential management system, shown as user profile management system 10, includes a remote sever (e.g., a credential management server, a profile management server, etc,), shown as server 100, a portable device (e.g., a smartphone, a mobile phone, a cell phone, a tablet, a laptop, a smartwatch, a smartcard, a keycard, etc.), shown as user device 200, and a product (e.g., an electronic locking device, an electronic padlock, an electronic puck lock, an electronic key safe, an electronic and portable lock box, an electronic lock box, an electronic locker, an electronic door lock, a door access system, etc.), shown as locking system 300. As shown in FIG. 1, the server 100 is configured to communicate with the user device 200 (e.g., using a first communication protocol, using a long-range communication protocol, cellular, Wi-Fi, radio, etc.) and the user device 200 is configured to communicate with the locking system 300 (e.g., using a second communication protocol, using a short-range communication protocol, Bluetooth, Bluetooth low energy ("BLE"), near-field communication ("NFC"), radio frequency identification ("RFID"), etc.). The user device 200 may thereby function as an intermediary device that facilitates data transmissions between the server 100 and the locking system 300 (e.g., if the locking system 300 is a disconnected device, etc.). In some embodiments, the locking system 300 is configured to facilitate direct communication with the server 100 (e.g., using a long-range communication protocol, cellular, Wi-Fi, radio, etc.). In some embodiments, the server 100 is or includes a plurality of severs. In some embodiments, the server 100 communicates with a plurality of user devices 200. In some embodiments, the user device 200 communicates with a plurality of locking systems 300. In some embodiments, a plurality of user devices 200 communicate with the locking system 300. In some embodiments, the server 100 communicates with a plurality of locking systems 300.

According to an exemplary embodiment, the server 100 is configured to manage a plurality of access credentials or user profiles for a plurality of users that have access to at least one of the locking systems 300 associated the user profile management system 10. The server 100 is further configured to selectively deliver one or more of the user profiles of a respective user to a respective user device 200

(e.g., owned, operated, etc. by the respective user) according to a profile delivery protocol (e.g., based on location, server loading, etc.). According to an exemplary embodiment, the server 100 implements a profile delivery protocol that delivers the one or more of the user profiles associated with a respective user to their user device 200 based on the current location of the user device 200 and a geofence. In some embodiments, the server 100 implements a dynamic profile delivery protocol that delivers the one or more user profiles of the respective user to the respective user device 200 according to various different profile delivery protocols based on the current demand or loading on the server 100 (e.g., throttling techniques to reduce server load, etc.).

In general, a user profile may include one or more files that include data related to operation of a respective locking system 300. For example, the user profile may contain a user schedule of when an associated locking system 300 may be accessed (unlocked, locked, etc.). The schedule may specify lock access permissions, e.g., by day of the week, including starting times (hours, minutes, etc.) and ending times (hours, minutes, etc.) for each corresponding permission. For example, a schedule may specify the time spans in which the associated locking system 300 may be unlocked via the user device 200 of the specific user associated with the user profile. As another example, the schedule may specify time periods in which typical interactions are expected to occur, and a level of trust may be determined based on these time periods. Accordingly, an unlock request sent within an expected time period may be more trusted by the associated locking system 300 than a request sent at an unexpected/atypical time. In one embodiment, a default user schedule is set (e.g., by the manufacturer, etc.). Additionally, a list of typical user schedules may also be provided to allow a user to select from one of many configuration options. In this manner, a manufacturer may provide various recommended operational settings to a user. A user may also customize a schedule to tailor the schedule as he or she desires (e.g., an administrator, etc.).

A user profile may further specify a model/serial number of the associated locking system 300 and what types of accesses are available for that user. For example, such accesses may include: reading software/hardware version information of the associated locking system 300, updating software of the associated locking system 300, reading a shackle/latch state of the associated locking system 300, locking, unlocking, disarming, reading/setting a time/clock value, reading a battery level, reading/clearing event related data (e.g., flags, counters, etc.), reading a log of the lock, reading/setting/resetting a keypad code of the associated locking system 300, reading communications data for the associated locking system 300 (e.g., transmission statuses, transmission power levels, channel information, addressing information, etc.), reading/setting default values stored for the associated locking system 300 (e.g., default disarm times, default unlock times, etc.), among others. A user profile may also specify a start time and a revocation date/time for the user profile (i.e., when the user profile begins to be valid and when the user profile expires and is no longer valid). A user profile may provide maximum disarm/unlock times for the associated locking system 300. A user profile may also provide an indication of a trust level of a corresponding user device 200 (e.g., whether a time value/timestamp provided by the user device 200 is trusted or not). The locking system 300 may be configured to allow or disallow certain functionality based on the trust level of a respective user device 200 requesting access thereto. The trust level may be stored as an independent permission that the user may or may not have access to (e.g., the trust level may be managed/adjusted by the software of the locking system 300, the user device 200, the server 100, etc.). As an example, only a highly trusted user device 200 may be able to upgrade the firmware of a respective locking system 300 or change certain settings.

Additionally, the locking systems 300 may have a security algorithm that factors in a trust level and time value. For example, as a respective user device 200 successfully interacts with a respective locking system 300 more often, the respective locking system 300 may increase (or adjust) a trust level for the respective user device 200. However, if a time value is out of sync with the maintained time of the respective locking system 300 or authentication fails, the respective locking system 300 may decrease (or adjust) a trust level for the respective user device 200. The time value provided by the respective user device 200 may be compared to a time value maintained by the respective locking system 300, and a degree of closeness between the two times may be used to indicate a trust level for the respective user device 200 (e.g., the closer the two times are to being in sync, the higher the trust level, etc.). If a trust level decreases below a certain threshold, the respective locking system 300 may discontinue or limit interactions with the respective user device 200. A trust level may also be based on the schedule discussed above. For example, a respective user device 200 may be regarded as more or less trusted based on the time the respective user device 200 is accessing a respective locking system 300, and whether that time falls within certain time periods as defined by the schedule. The time value provided by the respective user device 200 may also be used to sync the clock of a respective locking system 300 with that of the respective user device 200 or may be used otherwise during authenticated communications. Any of the user profile items discussed may have default values (e.g., manufacturer defaults) or user provided values (e.g., from a user with administrator permission access, etc.). A user profile is not limited to the above data, and additional data may be included or excluded.

According to an exemplary embodiment, the user profile management system 10 implements an approach that provides for secure communication between the user device 200 and the locking systems 300 (and/or the server 100 and the locking systems 300 for locking systems 300 that are in direct communication with the server 100) using a two key authentication scheme, without both keys being stored on the locking systems 300 (e.g., during a manufacturing phase). In such an embodiment, (i) a first key or a lock key is known/stored on each of the locking systems 300 and the server 100 that is unique to each locking system 300 and (ii) a second key or a user key is known/stored on each of the user devices 200 that is unique to each of the user devices 200 or user profiles and not pre-stored on any of the locking systems 300. Each lock key, each user key, and each user profile may be specific to a respective locking system 300. In this manner, the lock key, the user key, and the user profile may uniquely relate to a single locking system 300. According to an exemplary embodiment, the server 100 is configured to encrypt each user profile with the lock key of the locking system 300 that the user profile is associated with. When attempting to access a locking system 300, a user device 200 may receive a lock identifier from the locking system 300 and compare the lock identifier to a list of lock identifiers associated with one or more encrypted user profiles currently loaded onto the user device 200 (e.g., that were delivered according to the profile delivery protocol). If a match is found, the user device 200 may transmit the associated encrypted user profile to the locking system 300. The encrypted user profile includes the user key. The locking system 300 may decrypt the encrypted user profile using the lock key pre-stored thereon to obtain the user key. The user device 200 may then generate and transmit an encrypted command to the locking system 300. The encrypted command is encrypted using the user key. The locking system 300 may then decrypt the encrypted command using the user key obtained from the decrypted user profile and initiate the action specified by the decrypted command (e.g., unlocking a physical locking component, implementing a firmware update, etc.). In some embodiments, the two key authentication process including the lock key and the user key additionally includes a handshake nonce, a reply nonce, and/or a modified reply nonce, as described in more detail herein.

It should be understood that the two key authentication scheme described herein is not meant to be limiting, but is provided as an example of one possible way to provide secure communication between the server 100, the user devices 200, and the locking systems 300 of the user profile management system 10. In other embodiments, secure communication is otherwise established using a different authentication scheme such as an authentication scheme that employs digital signatures, challenge-response procedures, multi-factor authentication (e.g., two-factor authentication, user profile plus a biometric, a user profile plus a PIN, etc.), and/or still other suitable authentication schemes.

Server

Figure 2A:
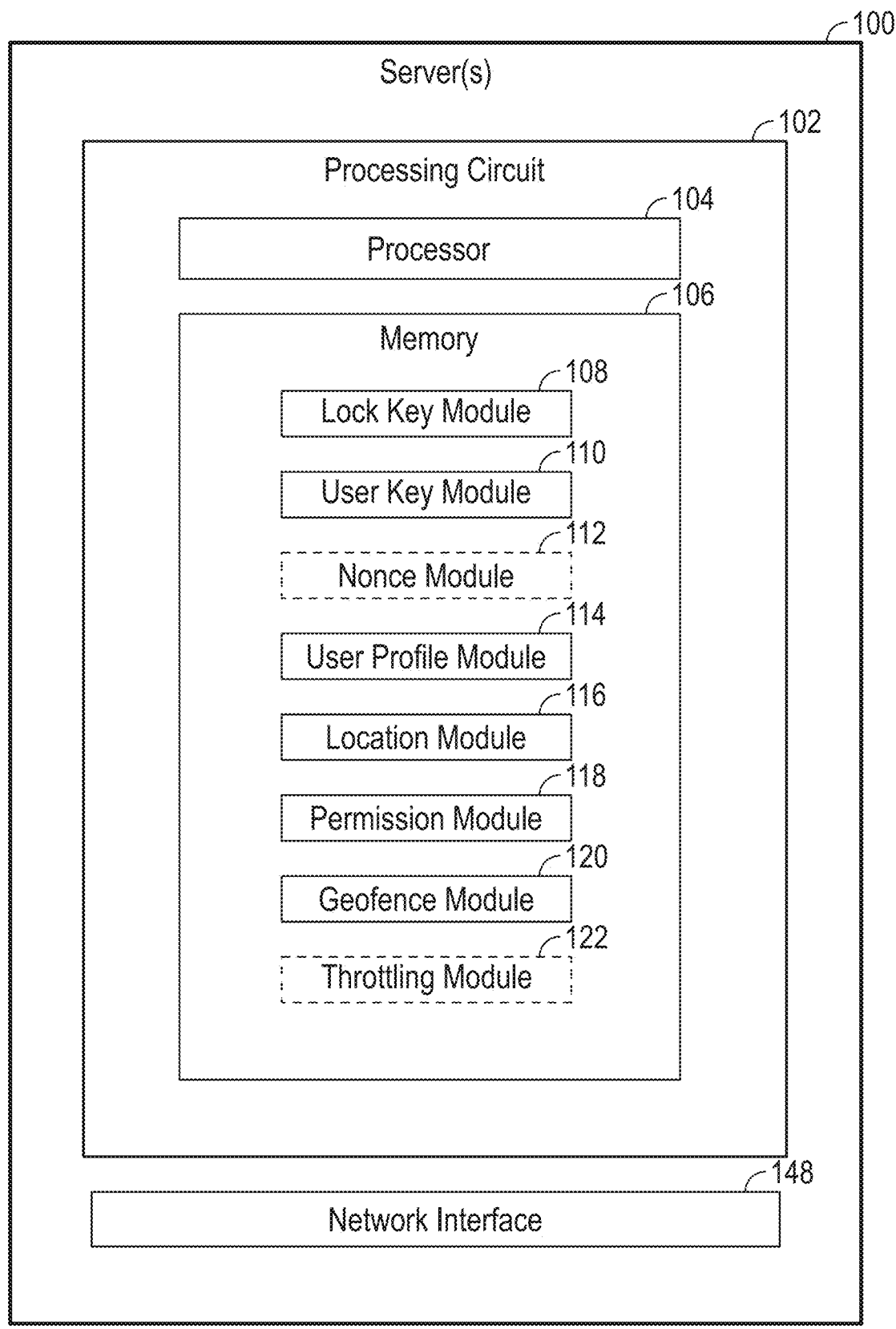
FIGS. 2A and 2B are block diagrams of the one or more servers of FIG. 1, according to an exemplary embodiment.

As shown in FIG. 2A, the server 100 includes a processing circuit 102 and a network interface 148. The processing circuit 102 has a processor 104 and a memory 106. The processing circuit 102 may include a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. In some embodiments, the processor 104 is configured to execute computer code stored in the memory 106 to facilitate the activities described herein. The memory 106 may be any volatile or non-volatile computer-readable storage medium capable of storing data or computer code relating to the activities described herein. According to an exemplary embodiment, the memory 106 includes computer code modules (e.g., executable code, object code, source code, script code, machine code, etc.) configured for execution by the processor 104.

According to an exemplary embodiment, the network interface 148 is configured to facilitate wireless communication from and to the server 100 (i) directly to and from the user devices 200, (ii) indirectly to and from at least one of the locking systems 300 through the user devices 200 (e.g., for locking systems 300 that are disconnected devices), and/or (iii) directly to and from at least one of the locking systems 300 (e.g., for locking systems 300 that are connected devices). The server 100 may communicate with the user devices 200 and/or the locking systems 300 directly or via an intermediate network (e.g., an internet network, a cellular network, etc.). For example, the network interface 148 may include physical network components (e.g., a network card, etc.) configured to allow the server 100 to establish a connection to the user devices 200 and/or the locking systems 300. In one embodiment, communications from the network interface 148 are routed through a cellular interface, allowing the server 100 to communicate with the user devices 200 and/or the locking systems 300 via a cellular network. In one embodiment, the network interface 148 allows the server 100 to establish an Internet-based connection with the user devices 200 and/or the locking systems 300. The server 100 may be one server (a physical or virtual server) or may include multiple servers.

According to an exemplary embodiment, the memory 106 of the server 100 includes various modules configured to (i) generate and securely store the lock keys, the user keys, and the user profiles and (ii) selectively and/or dynamically deliver encrypted user profiles (e.g., each including an associated user key) to the user devices 200 based on one or more factors including the location of the user devices 200, the permissions of the users (e.g., clearance/authorization level, time schedule, etc.) of the user devices 200, the current cumulative loading on the server 100, and/or still other possible factors.

As shown in FIG. 2A, the memory 106 of the server 100 includes a lock key module 108, a user key module 110, a nonce module 112, a user profile module 114, a location module 116, a permission module 118, a geofence module 120, and a throttling module 122. In some embodiments, the memory 106 does not include the nonce module 112. In some embodiments, the memory 106 does not include the throttling module 122. By way of example, the memory 106 may not include the throttling module 122 in a user profile management system 10 having less than a threshold number of locking systems 300 associated therewith and/or managed thereby (e.g., less than 100, 200, 500, 1000, etc. locking systems 300).

The lock key module 108 is configured to generate and securely store the lock keys (e.g., which may be provided to the locking systems 300 at the time of manufacturing, etc.). As an example, the lock key module 108 may correspond to a first database of keys and may include the software configured to store and retrieve such keys from the first database. The lock key module 108 may be further configured to facilitate updating, replacing, and/or deleting the lock keys (e.g., if a respective lock key on a respective locking system 300 is compromised, etc.), which may be propagated to the associated locking systems 300 using the methods described herein (e.g., directly for connected devices, indirectly for disconnected devices through the user devices 200, etc.).

The user key module 110 is configured to generate and securely store the user keys (e.g., when a user is registered to a respective locking system 300, etc.). As an example, the user key module 110 may correspond to a second database of keys and may include the software configured to store and retrieve such keys from the second database. The user key module 110 may be further configured to facilitate updating, replacing, and/or deleting the user keys (e.g., if a user's access is revoked, if a user key expires, etc.), which may be updated in the associated user profiles as necessary.

The nonce module 112 is configured to generate a handshake nonce for each of the user profiles each time the user profiles are transmitted to the user devices 200. In some embodiments, the handshake nonce is not used.

The user profile module 114 is configured to generate and securely store the user profiles. As an example, the user profile module 114 may correspond to a third database of user profiles and may include the software configured to store and retrieve such user profiles from the third database. The user profile module 114 may be further configured to facilitate updating, replacing, and/or deleting the user profiles. By way of example, the user profile module 114 may be configured to generate a user profile for a specific user and/or locking system 300 when a new user is added to a respective locking system 300, in response to a respective user profile expiring, etc. The user profile module 114 is further configured to encrypt the user profiles prior to or as they are being transmitted to the user devices 200. By way of example, when a user profile is transmitted to a respective user device 200, the user profile module 114 may be configured to (i) insert the associated user key into or append the associated key to the user profile, (ii) encrypt the user profile and user key using (a) the lock key associated with a specific locking system 300 and/or (b) the handshake nonce (in embodiments where the handshake nonce is used) to generate an encrypted user profile, and/or (iii) append (a) the user key and/or (b) the handshake nonce (in embodiments where the handshake nonce is used) to the encrypted user profile. The user profile module 114 may be further configured to facilitate updating, replacing, and/or deleting the user profiles (e.g., if a user's access is revoked, if a user key is updated, etc.).

The location module 116 is configured to receive first location data from the user devices 200 regarding the current location of the user devices 200 (e.g., in real-time, periodically, etc.). In some embodiments, the location module 116 is configured to receive second location data from the user devices 200 and/or the locking systems 300 regarding the current location (e.g., in real-time) and/or the last known location of the locking systems 300. In some embodiments, the location module 116 is configured to store a predefined location of one or more of the locking systems 300 (e.g., a fixed locking system). The first location data and the second location data may be generated by the user devices 200 and/or the locking systems 300 as described in more detail herein.

The permission module 118 is configured to receive and store access permissions for users associated with one or more of the locking systems 300. The access permissions may include an authorization or clearance level of the user (e.g., administrator clearance, limited clearance, etc.) that defines which of the locking systems 300 the respective user is able to access and/or limit their access thereto (e.g., a first user may only unlock or lock a respective locking system 300 but not change the settings thereof, while a second user may unlock or lock the respective locking system 300 and change the settings thereof, etc.). The access permissions may also include an access schedule as described in more detail herein that limits the times a user may access a respective locking system 300 and/or that affects the trust level of a user attempting to access a respective locking system 300 outside of the access schedule.

The geofence module 120 is configured to selectively deliver a subset of the encrypted user profiles (e.g., stored in the user profile module 114) associated with a respective user to the user device 200 of the respective user based on (i) the current location of the user device 200 (e.g., received by the location module 116), (ii) the current or last know location of the locking systems 300 that the respective user has access to (e.g., received by the location module 116), and (iii) a geofence assigned to the respective user and stored in the geofence module 120. The size of the geofence (e.g., radius) may be static or may be dynamic (e.g., based on the day of the week, the time of the day, the current loading on the server 100, etc.). The geofence may be predefined and fixed from user adjustment (e.g., set by an administrator, according to a subscription level of the user or company, based on current demand on the server 100, etc.) or selectively adjustable based on user preference. By way of example, the geofence module 120 may dynamically reduce the size of the geofence when a load on the server 100 exceeds various thresholds.

Figure 3A:
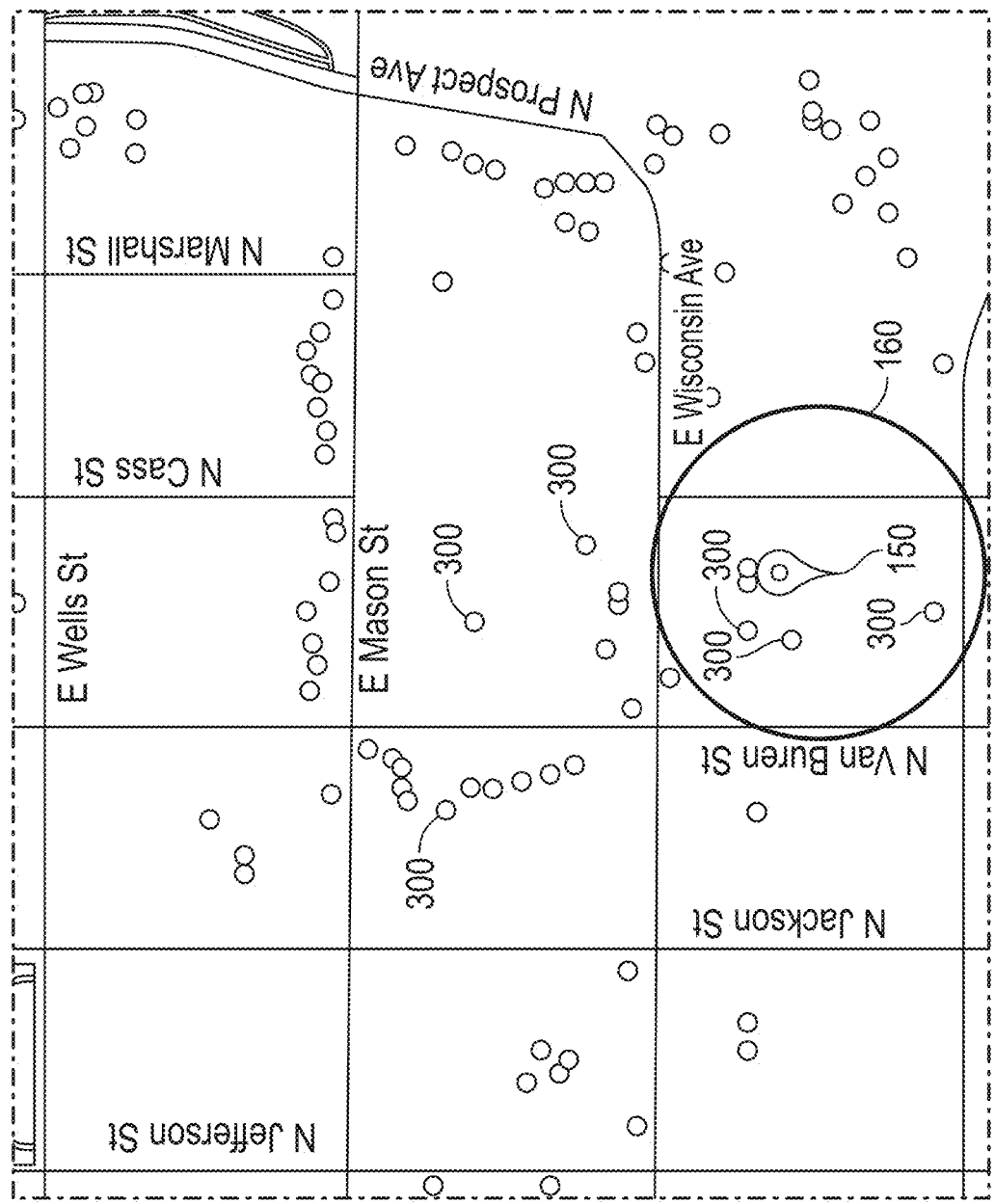
FIG. 3A depicts a first technique for implementing a geofence using the system for wireless user profile management of FIG. 1, according to an exemplary embodiment.

As shown in FIG. 3A, the geofence module 120 is configured to implement a first geofence, shown as geofence 160, that is defined based on a radius extending from a location, shown as current location 150, of the user device 200 of a respective user. The geofence 160 therefore forms a circle that extends around the current location 150 of the user device 200. The radius of the geofence 160 may be fixed from user adjustment (e.g., based on a subscription level of the user or company the user is associated with, based on the loading on the server 100, etc.) or selectively adjustable based on user preference (e.g., from 100 feet to 5 miles, etc.). The geofence module 120 is configured to deliver only the encrypted user profiles for the locking systems 300 that are positioned within the geofence 160 and/or that the respective user has access to (e.g., based on the access permissions defined in the permission module 118) to the respective user device 200, while the encrypted user profiles associated with the locking systems 300 outside of the geofence 160 are not delivered to the respective user device 200.

In some embodiments, the encrypted user profiles on the respective user device 200 are added and removed as the current location 150 of the respective user device 200 changes. By way of example, as locking systems 300 "enter" and "exit" the geofence 160 (i.e., as the user moves around, thereby changing the current location 150), the encrypted user profiles associated with those locking systems 300 will be added to or dropped from (e.g., removed, wiped, etc.), respectively, the respective user device 200. Such monitoring of the current location 150 of the respective user device 200 may be continuous, periodic (e.g., every thirty seconds, every minute, every five minutes, every fifteen minutes, etc.), and/or passive (e.g., in response to the user opening an application on the respective user device 200 associated with the user profile management system 10). The geofence module 120 may switch between continuous, periodic, and/or passive profile delivery based on the current demand on the server 100.

Figure 3B:
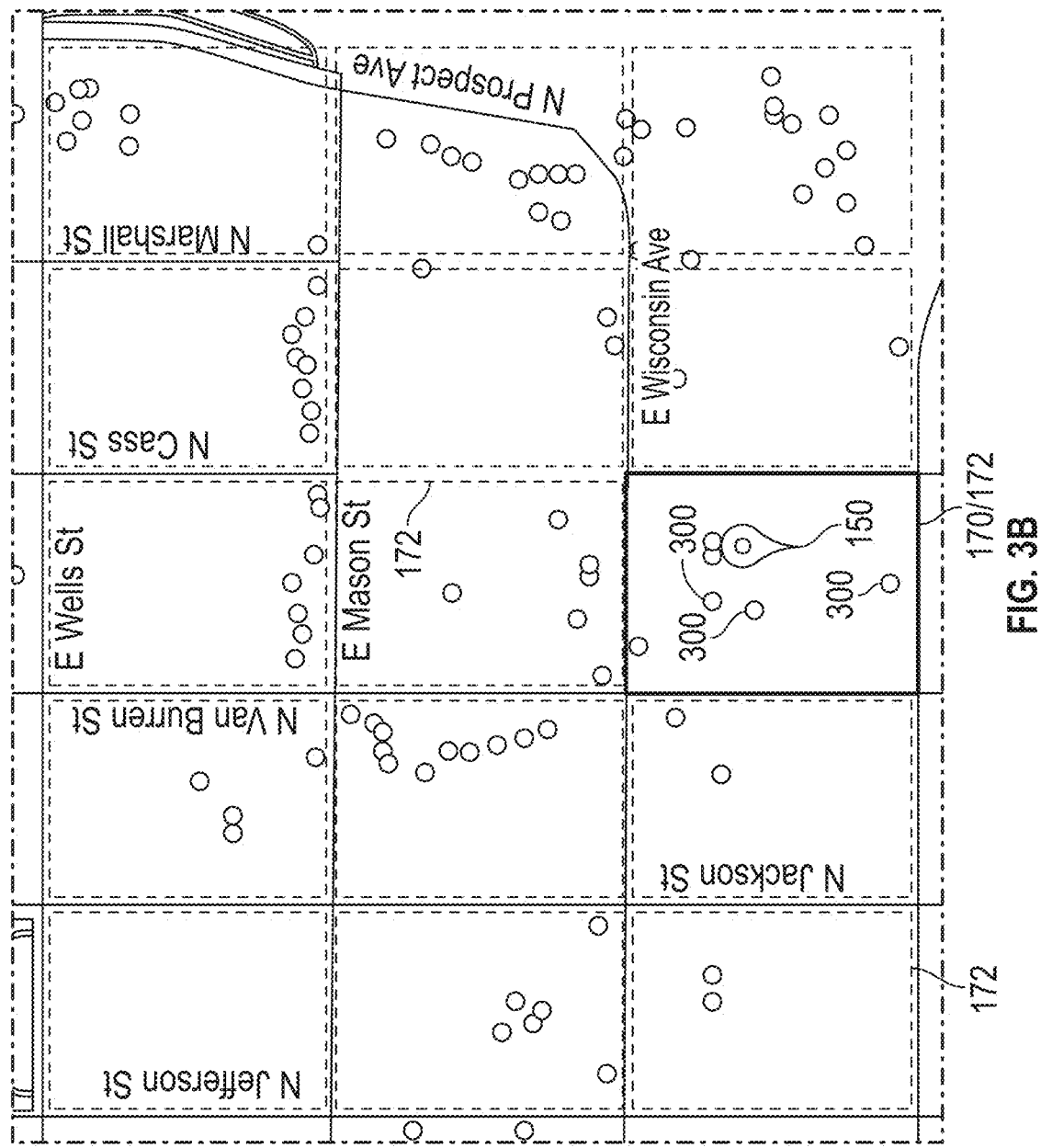
FIG. 3B depicts a second technique for implementing a geofence using the system for wireless user profile management of FIG. 1, according to an exemplary embodiment.

As shown in FIG. 3B, the geofence module 120 is configured to implement a second geofence, shown as geofence 170, that is defined based on a predefined area (e.g., a city, a large factory or plant, a campus, etc.) that is subdivided into regions (e.g., a city block, etc.), shown as geofence sectors 172. According to an exemplary embodiment, the geofence module 120 is configured to selectively activate the geofence 170 around a respective geofence sector 172 in response to the current location 150 of a respective user device 200 being positioned within one of the predefined geofence sectors 172. The geofence module 120 is configured to deliver only the encrypted user profiles for the locking systems 300 that are positioned within the geofence 170 of the current, activated geofence sector 172 and/or that the respective user has access to (e.g., based on the access permissions defined in the permission module 118) to the respective user device 200, while the encrypted user profiles associated with the locking systems 300 outside of the geofence 170 and positioned within inactivated geofence sectors 172 are not delivered to the respective user device 200.

In some embodiments, the encrypted user profiles on the respective user device 200 are added and removed as the current location 150 of the respective user device 200 changes. By way of example, as the respective user device 200 leaves a first geofence sector 172 and enters a second geofence sector 172 (i.e., as the user moves around, thereby changing the current location 150), the encrypted user profiles associated with the locking systems 300 within the first geofence sector 172 may be dropped from the respective user device 200 and the encrypted user profiles associated with the locking systems 300 within the second geofence sector 172 may be added to the respective user device 200. Such transitioning between the various geofence sectors 172 may be continuously monitored, periodically monitored (e.g., every thirty seconds, every minute, every five minutes, every fifteen minutes, etc.), and/or passively monitored (e.g., in response to the user opening an application on the respective user device 200 associated with the user profile management system 10). The geofence module 120 may switch between continuous, periodic, and/or passive profile delivery based on the current demand on the server 100.

Figure 3C:
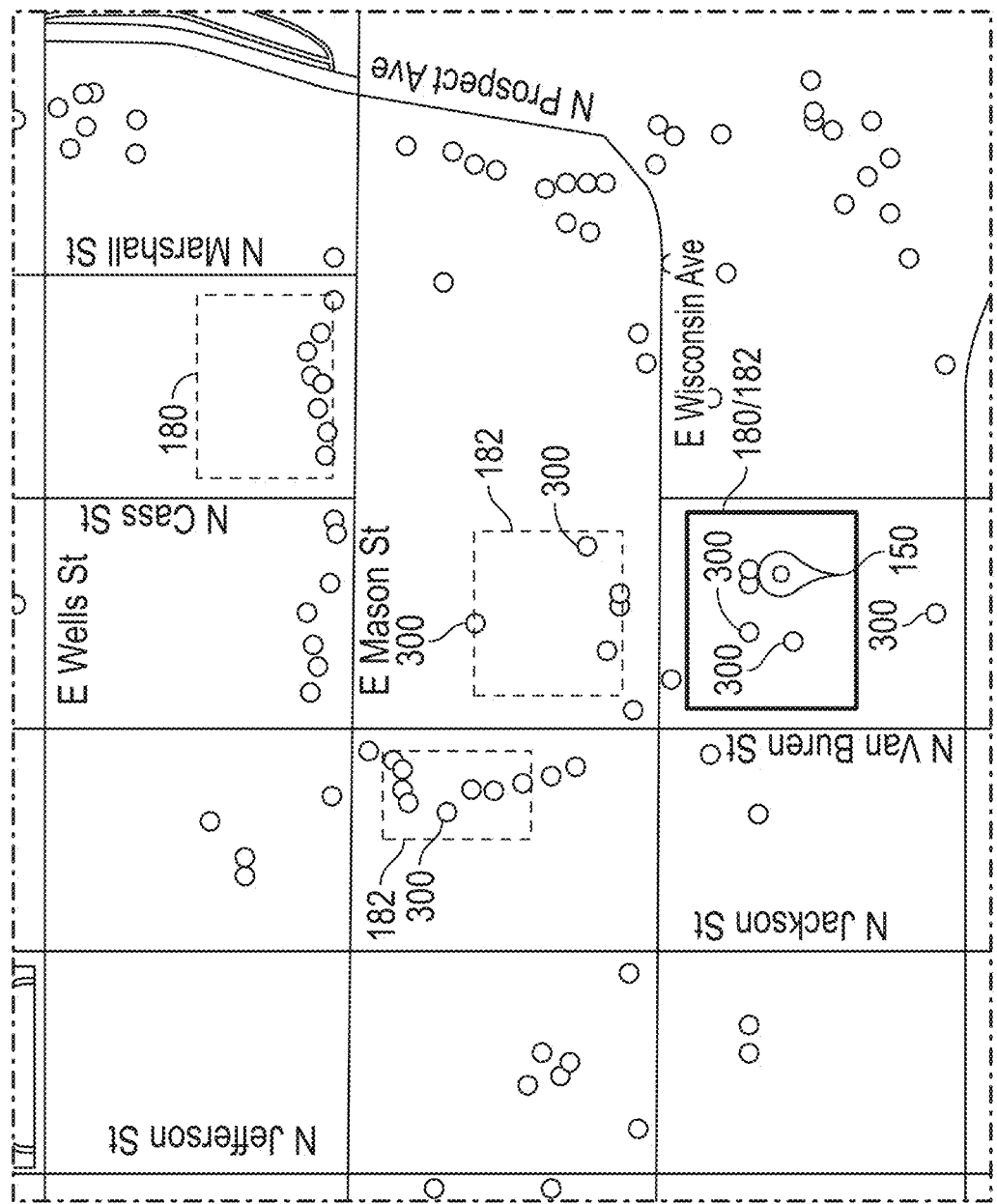
FIG. 3C depicts a third technique for implementing a geofence using the system for wireless user profile management of FIG. 1, according to an exemplary embodiment.

As shown in FIG. 3C, the geofence module 120 is configured to implement a third geofence, shown as geofence 180, that is defined based on a predefined footprint of buildings or floors of buildings a user has access to, shown as building footprints 182. According to an exemplary embodiment, the geofence module 120 is configured to selectively activate the geofence 180 around a respective building footprint 182 in response to the current location 150 of a respective user device 200 being positioned within one of the building footprints 182. The geofence module 120 is configured to deliver only the encrypted user profiles for the locking systems 300 that are positioned within the geofence 180 of the current, activated building footprint 182 and/or that the respective user has access to (e.g., based on the access permissions defined in the permission module 118) to the respective user device 200, while the encrypted user profiles associated with the locking systems 300 outside of the geofence 180 and positioned within inactivated building footprints 182 are not delivered to the respective user device 200.

In some embodiments, the encrypted user profiles on the respective user device 200 are added and removed as the current location 150 of the respective user device 200 changes. By way of example, as the respective user device 200 leaves a first building footprint 182 and enters a second building footprint 182 (i.e., as the user moves around, thereby changing the current location 150), the encrypted user profiles associated with the locking systems 300 within the first building footprint 182 may be dropped from the respective user device 200 and the encrypted user profiles associated with the locking systems 300 within the second building footprint 182 may be added to the respective user device 200. Such transitioning between the various building footprints 182 may be continuously monitored, periodically monitored (e.g., every thirty seconds, every minute, every five minutes, every fifteen minutes, etc.), passively monitored (e.g., in response to the user opening an application on the respective user device 200 associated with the user profile management system 10), and/or monitored based on clocking, checking, entering, badging, etc. into and out of buildings associated with the building floor footprints 182. The geofence module 120 may switch between continuous, periodic, and/or passive profile delivery based on the current demand on the server 100.

In some embodiments, the encrypted user profiles on a respective user device 200 are not removed immediately in response to the associated locking system 300 no longer falling within the geofence 160, the geofence 170, and/or the geofence 180 as the current location 150 of the respective user device 200 changes in response to the user moving. By way of example, some users may have access to a "roaming" feature. When the roaming feature is activated, encrypted user profiles are loaded onto and remain on the respective user device 200 for a designated period (e.g., for the entirety of a work shift of the user, etc.) before being removed from the respective user device 200. For example, a user may be at a first location with a first subset of the locking systems 300 and then move to a second location with a second subset of the locking systems 300. The geofence module 120 may thereby deliver the encrypted user profiles associated with the first subset of locking systems 300 to the respective user device 200 when at the first location. The geofence module 120 may then deliver the encrypted user profiles associated with the second subset of locking systems 300 to the respective user device 200 when at the second location, while maintaining the encrypted user profiles associated with the first subset of locking systems 300 on the user device 200. Then, the geofence module 120 may remove all of the encrypted user profiles on the respective user device 200 at the expiration of the designated period (e.g., end of the user's shift, etc.). Such a roaming mode may prevent the same user profiles from being loaded and removed multiple times throughout a day if the user bounces back and forth between various locations (e.g., reducing the load on the server 100, etc.).

In some embodiments, the throttling module 122 is configured employ throttling techniques to reduce the loading on the server 100 when the demand on the server 100 is above one or more thresholds or in response to one or more throttling triggers. Throttling may affect one user differently than another user. By way of example, the server 100 may throttle profile delivery for a first user before a second user (e.g., based on a subscription level, authorization level, permission level, etc.). The throttling technique may include transitioning from a proximity/geofence delivery protocol (as described with regards to the geofence module 120) to a non-geofence delivery protocol. Various non-geofence delivery protocols may be employed to reduce server loading, including techniques such as an awake delivery protocol, a favorites delivery protocol, a favorites key chain delivery protocol, a known offline delivery protocol, an override request delivery protocol, a key cache delivery protocol, a dynamic lifespans delivery protocol, and a security slider delivery protocol.

Figure 2B:
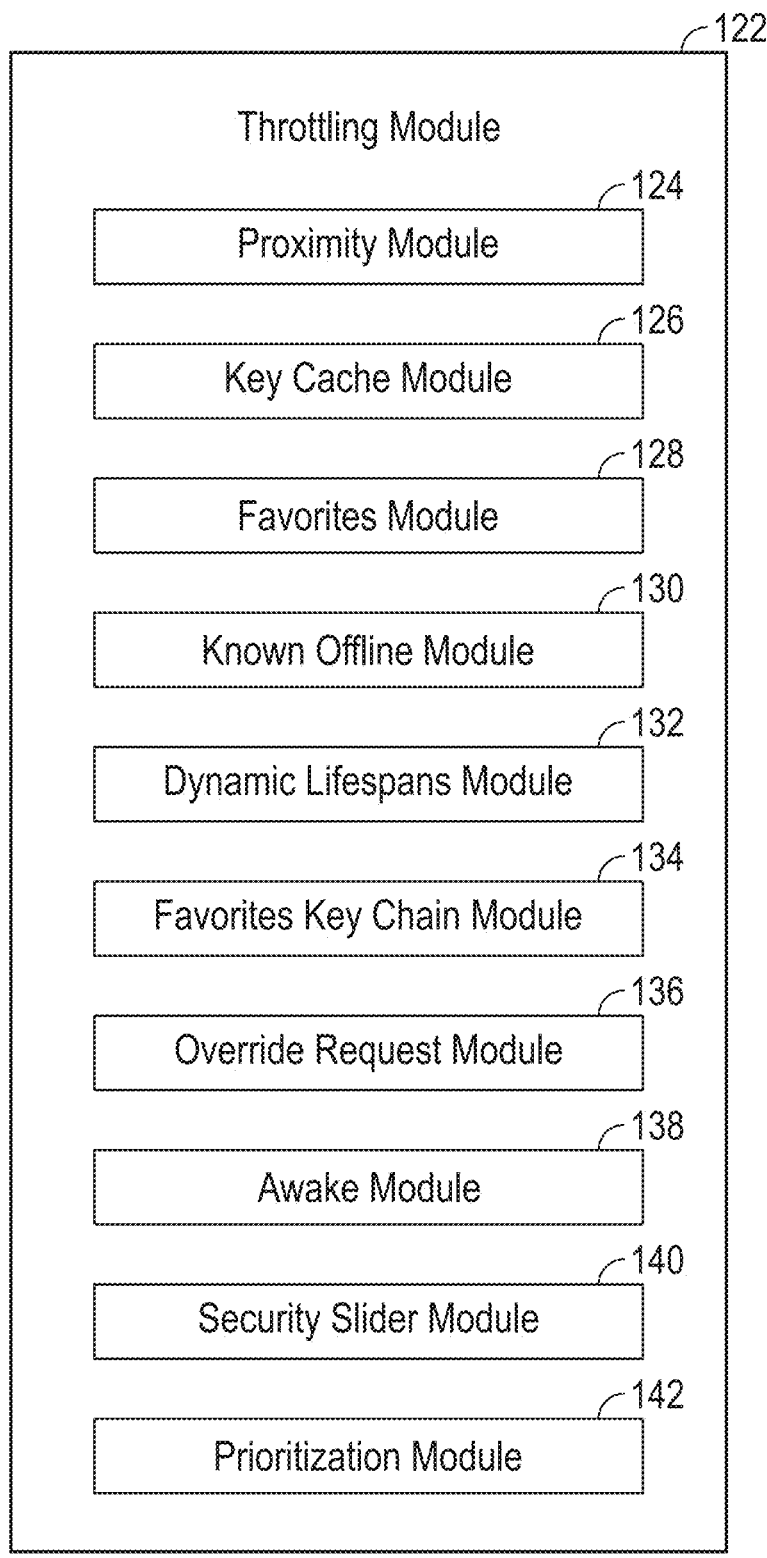

As shown in FIG. 2B, the throttling module 122 includes a plurality of submodules, shown as proximity module 124, key cache module 126, favorites module 128, known offline module 130, dynamic lifespans module 132, favorites key chain module 134, override request module 136, awake module 138, security slider module 140, and prioritization module 142. As a brief overview, (i) the proximity module 124 is configured to facilitate implementing the geofence delivery protocol (as described herein in relation to the geofence module 120), (ii) the key cache module 126, the favorites module 128, the known offline module 130, the dynamic lifespans module 132, the favorites key chain module 134, the override request module 136, and the awake module 138 are configured to implement the various non-geofence delivery protocols, and (iii) the prioritization module 142 is configured to dynamically transition the delivery of the user profiles (a) between the geofence delivery protocol and the various non-geofence delivery protocols and (b) amongst the various non-geofence delivery protocols based on the current demand or loading on the server 100.

The key cache module 126 is configured to facilitate implementing the key cache delivery protocol for the user profiles. According to an exemplary embodiment, the key cache module 126 is configured to asynchronously refresh a user profile pool for each user when system demand is low (e.g., lower than a threshold demand level, etc.) and store such user profile pools in a cache that is readily accessible by each user when needed for accessing a locking system 300 accessible by the user. Such pre-buffering reduces the loading on the system during higher peak access times. The key cache module 126 may select the user profiles for the user profile pools based on various factors including past access/download history, the current time and day, the current location of the user device 200, etc. Therefore, the key cache module 126 is configured to intelligently pre-load or pre-buffer user profiles while the server 100 has free or unused capacity such that the user profiles can be delivered to the user devices 200 when needed at a reduced load to the server 100.

The favorites module 128 is configured to facilitate implementing the favorites delivery protocol for delivering the user profiles. According to an exemplary embodiment, the favorites module 128 is configured to monitor the access history of each of the user devices 200 (e.g., through audit trails provided by the user devices 200 following accessing a locking system 300, etc.) to determine how frequently a respective user accesses each locking system 300 that the respective user is permitted to access. Based on the access history, the favorites module 128 may be configured to sort the locking systems 300 that a respective user has access to based on access frequency over a certain period of time (e.g., the number of times each locking system 300 has been accessed by the user, over the previous day, over the last week, over the last month, etc.). The favorites module 128 may then automatically generate a favorites list for each user that includes the user profiles for the locking systems 300 most frequently visited by each user determined based on the access history. According to an exemplary embodiment, the favorites module 128 is configured dynamically update the favorites lists based on updated access histories of the users. The number of user profiles included in the favorites list may vary from user to user. By way of example, a first user may have a first subscription that provides a favorites list having a first number of user profiles (e.g., five, ten, fifteen, etc. user profiles), while a second user may have a second subscription that provides a favorites list having a second, greater number of user profiles (e.g., twenty, twenty-five, etc. user profiles). When the favorites delivery protocol is being implemented by the favorites module 128 to deliver user profiles to one or more of the user devices 200, the one or more of the user devices 200 may be automatically sent only the user profiles for the locking systems 300 on the favorites lists for the users thereof. The user devices 200 may access the locking systems 300 not included in the favorites list manually using another delivery protocol (e.g., the awake delivery protocol, the override request delivery protocol, the favorites key chain delivery protocol, etc.).

The known offline module 130 is configured to facilitate implementing the known offline delivery protocol for delivering the user profiles. According to an exemplary embodiment, the known offline module 130 is configured to identify locking systems 300 that are located in areas where wireless connection for the user devices 200 is known to be poor. In some embodiments, the known offline module 130 is configured to manually receive an indication of the locking systems 300 located in poor connection areas (e.g., by a user via their respective user device 200, etc.). In some embodiments, the known offline module 130 is additionally or alternatively configured to automatically determine which of the locking systems 300 are located in areas where wireless connection for the user devices 200 is known to be poor. By way of example, when the user devices 200 access the locking systems 300, the user devices 200 and/or the locking systems 300 are configured to generate an audit trail detailing the interaction (e.g., which locking system was accessed, what time the access occurred, what functions were performed, etc.). The user devices 200 and/or the locking systems 300 may also insert details into the audit trail regarding connection (e.g., cellular connection, network connection, etc.) at the time that the locking system 300 was accessed. The known offline module 130 may be configured to (i) interpret such connection information within the audit trails received from the user devices 200 and (ii) identify which of the locking systems 300 should be classified as being located in an area with poor connection (e.g., via machine learning, etc.). For example, if it is determined that when the user devices 200 access a specific locking system 300, connection is poor or nonexistent more than a threshold percentage of the time (e.g., 50%, 75%, etc.), then the specific locking system 300 may be flagged as being "known offline." Accordingly, when the known offline delivery protocol is being implemented by the known offline module 130 to deliver user profiles to one or more of the user devices 200, the one or more of the user devices 200 may be automatically sent only the user profiles for the locking systems 300 that are classified as "known offline." The user devices 200 may then access the other locking systems 300 (i.e., the non-known offline locking systems) manually using another delivery protocol (e.g., the awake delivery protocol, the override request delivery protocol, the favorites key chain delivery protocol, etc.).

The dynamic lifespans module 132 is configured to facilitate implementing the dynamic lifespans delivery protocol for delivering the user profiles. According to an exemplary embodiment, the dynamic lifespans module 132 is configured to dynamically adjust the lifespan (i.e., the amount of time a respective user profile is valid) of the user profiles associated with a respective user based on the frequency at which the user accesses the locking systems 300 associated with each user profile. By way of example, the dynamic lifespans module 132 may be configured to (i) identify and increase the lifespan for user profiles associated with locking systems 300 more frequently visited by a respective user and (ii) identify and decrease the lifespan for user profiles associated with locking systems 300 less frequently visited by the respective user. Accordingly, the user profiles more frequently used will remain active and stored offline on the user device 200 of the respective user for a longer duration of time and, therefore, prevent the need to continually redeliver the user profiles associated with the locking systems 300 more frequently visited by the respective user. While, on the other hand, the dynamic lifespans module 132 is configured to (i) identify and refrain from transmitting user profiles associated with the less frequently visited locking systems 300 and (ii) shorten the lifespan of such user profiles such that when these user profiles are requested by the user (e.g., on demand, via the override request delivery protocol, via the awake delivery protocol, etc.), the user profiles are valid for a duration of time shorter than usual (e.g., a single use, thirty minutes, etc.).

The favorites key chain module 134 is configured to facilitate implementing the favorites key chain delivery protocol for delivering the user profiles. According to an exemplary embodiment, the favorites key chain module 134 is configured to receive an indication of which locking systems 300 a respective user wishes to favorite (e.g., via manual selection on their user device 200, etc.). The favorites key chain module 134 is configured to generate a favorites key chain for the respective user based on the indication that includes the user profiles associated with the locking systems 300 that are manually favorited by the respective user. The number of user profiles included in the favorites key chain may vary from user to user. By way of example, a first user may have a first subscription that provides a favorites key chain having a first number of user profiles (e.g., five, ten, fifteen, etc. user profiles), while a second user may have a second subscription that provides a favorites key chain having a second, greater number of user profiles (e.g., twenty, twenty-five, etc. user profiles). When the favorites key chain delivery protocol is being implemented by the favorites key chain module 134 to deliver user profiles to one or more of the user devices 200, the one or more of the user devices 200 may be automatically sent only the user profiles for the locking systems 300 on the favorites key chains associated with the users thereof. The user devices 200 may access the locking systems 300 not included in the favorites key chain manually using another delivery protocol (e.g., the awake delivery protocol, the override request delivery protocol, etc.).

The override request module 136 is configured to facilitate implementing the override request delivery protocol for delivering the user profiles. According to an exemplary embodiment, the override request module 136 is configured to selectively deliver user profiles manually requested by a user on a user device 200. By way of example, during the override request delivery protocol, a user device 200 may display a list of the locking systems 300 that the user has access to. The list of the locking systems 300 may include (i) all of the locking systems 300 that the user has access to or (ii) only the locking systems 300 that the user has access to within the current geofence of the user device 200 and/or that the user device 200 does not currently have a user profile for locally stored thereon. The user may then select which of the locking systems 300 from the list of the locking systems 300 he or she wishes to have user profiles for. The override request module 136 may then deliver the user profiles for the selected locking systems 300 to the user device 200. Accordingly, when the override request delivery protocol is being implemented by the override request module 136 to deliver user profiles to one or more of the user devices 200, the one or more of the user devices 200 may be sent only the user profiles for the locking systems 300 manually requested via the user devices 200.

The awake module 138 is configured to facilitate implementing the awake delivery protocol for delivering the user profiles. According to an exemplary embodiment, the awake module 138 is configured to selectively deliver user profiles in real-time to user devices 200 that are in the process of attempting to access a locking system 300. By way of example, if a respective user device 200 does not currently have the user profile associated with a locking system 300, the user may awaken the locking system 300 (e.g., by pressing a button thereon, etc.). The locking system 300 may broadcast an identifier associated therewith in response to being awoken, which may be received by the respective user device 200 and transmitted to the server 100. The awake module 138 may be configured to verify that the respective user device 200 is permitted to access the locking system 300 and, in response to verifying the respective user device 200, transmit the user profile associated with the respective user device 200 for accessing the locking system 300 to the respective user device 200.

The security slider module 140 is configured to facilitate implementing the security slider delivery protocol for delivering the user profiles. According to an exemplary embodiment, the security slider module 140 is configured to facilitate a user (e.g., an administrator, etc.) in (i) selectively increasing security (and consequently increase demand on the server 100 and subscription cost) by choosing to have user profiles expire more frequently and (ii) selectively decreasing security (and consequently decrease demand on the server 100 and subscription cost) by choosing to have user profiles expire less frequently. By way of example, a user may choose to have user profiles associated with locking systems 300 located outside of a building expire more frequently and have user profiles associated with locking systems 300 located inside of a building expire less frequently. The security slider module 140 may therefore be configured to deliver the user profiles associated with the more secure locking systems 300 first while the security slider delivery protocol is being implemented.

The prioritization module 142 is configured employ throttling techniques to reduce the loading on the server 100 when the demand on the server 100 is above one or more thresholds or in response to one or more throttling triggers. By way of example, the prioritization module 142 may be configured to dynamically transition the delivery of the user profiles to one or more user devices 200 (i) between the geofence delivery protocol and the various non-geofence delivery protocols and (ii) amongst the various non-geofence delivery protocols based on (a) the current demand or loading on the server 100 from the user devices 200 and/or (b) the permission or subscription level of each user associated with the one or more user devices 200.

According to an exemplary embodiment, the prioritization module 142 is configured to determine and monitor a current aggregate loading on the server 100 as a result of delivering the user profiles to the user devices 200 using the geofence delivery protocol. The prioritization module 142 is then configured to determine whether the current aggregate loading on the server 100 (e.g., due to the number of user profile requests, longer than normal searches to deliver profiles, new profile generation and/or locks being added to the system by administrators, etc.) is greater than a load threshold. The prioritization module 142 may be configured to begin delivering user profiles associated with one or more of the user devices 200 to the one or more user devices 200 using a respective non-geofence delivery protocol (e.g., the awake delivery protocol, the favorites delivery protocol, the favorites key chain delivery protocol, the known offline delivery protocol, the override request delivery protocol, the key cache delivery protocol, the dynamic lifespans delivery protocol, the security slider delivery protocol, etc.) in response to the current aggregate loading being greater than the load threshold. By way of example, the prioritization module 142 may be configured to transition the delivery of the user profiles for lower permission level users and/or lower subscription level users from the geofence delivery protocol to one or more of the non-geofence delivery protocols before transitioning higher permission level users and/or higher subscription level users to reduce server loading, as necessary.

The prioritization module 142 may be further configured to (i) transition profile delivery from the geofence delivery protocol to the non-geofence delivery protocols for more of the user devices 200 that are not already receiving user profiles via the non-geofence delivery protocols and/or (ii) begin delivering the user profiles for the user devices 200 already receiving the user profiles via a non-geofence delivery protocol to a less load intensive non-geofence delivery protocol to reduce the server loading. The prioritization module 142 may continually do this until the current load on the server 100 reduces to an acceptable level (e.g., below the load threshold, etc.). By way of example, the prioritization module 142 may be configured to transition between the non-geofence delivery protocols in the following order: (i) the key cache delivery protocol, (ii) the favorites delivery protocol, (iii) the known offline delivery protocol, (iv) the dynamic lifespans delivery protocol, (v) the favorites key chain delivery protocol, (vi) the security slider delivery protocol, (vi) the override request delivery protocol, and (vii) the awake delivery protocol. It should be understood that the above-order is for illustration purposes only and that a different order may be implemented in different embodiments or for different users. In some embodiments, a user's permission level or subscription level may limit the non-geofence delivery protocols that may be implemented with that user (i.e., at least one of the non-geofence delivery protocols is not used with a respective user).

User Device

In general, the user device 200 is configured to selectively receive and store various encrypted user profiles according to the profile delivery protocols (e.g., the proximity/geofence delivery protocol, the non-geofence protocols, etc.) employed by the server 100 to facilitate accessing and/or at least partially managing the operation of the locking systems 300 to which the user device 200 has access. For example, the user device 200 may be used to unlock, lock, and/or otherwise manage the function of the locking systems 300 (e.g., change settings, update firmware, etc.). The user device 200 may access and/or manage the locking systems 300 through the use of an application ("app") that is configured to run on the user device 200. For example, the app may be installed on a mobile phone or other portable device, and the app may be used to configure and/or control the locking systems 300 over a wireless connection. In some embodiments, the user device 200 is a portable device such as a smartphone, a cell phone, a mobile phone, a tablet, a smart watch, a laptop computer, and/or another type of suitable portable device. In another embodiment, the user device 200 is a desktop computer.

Figure 4:
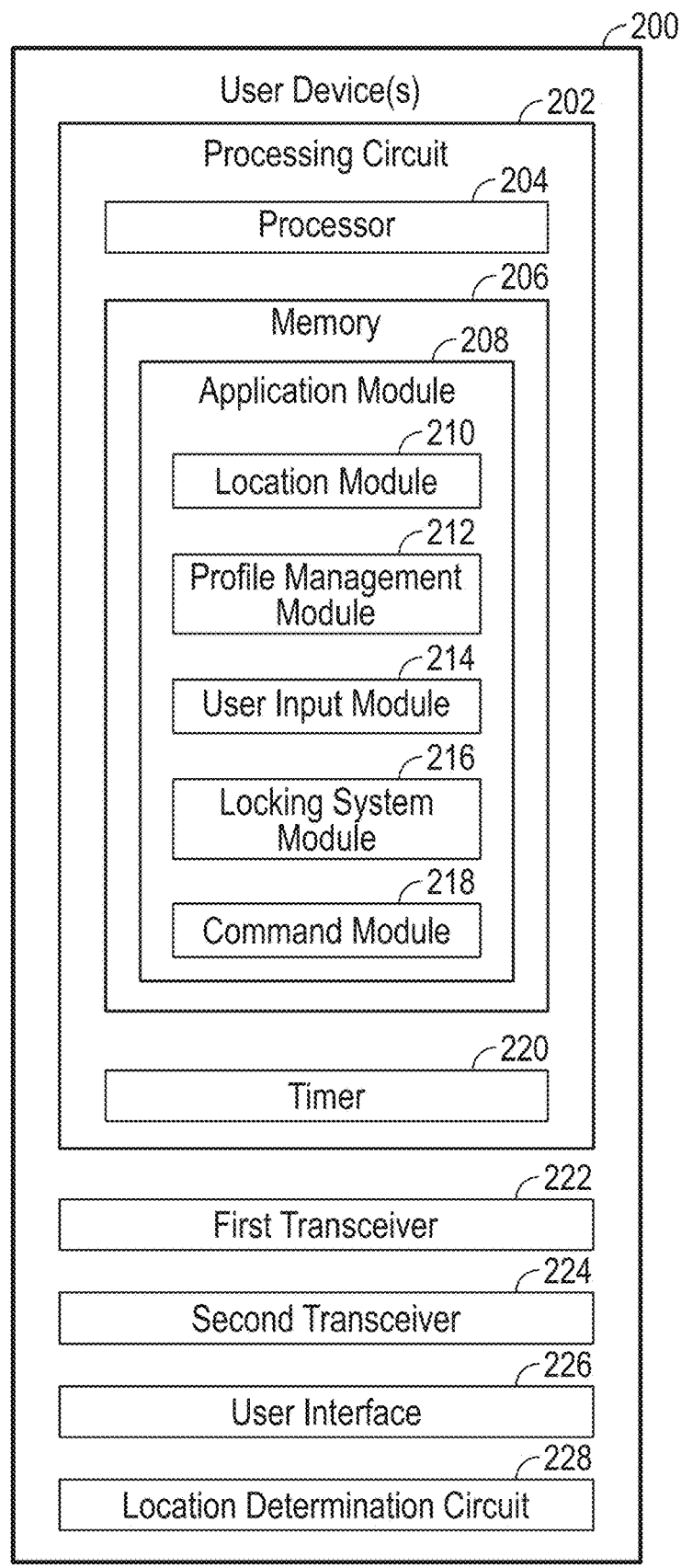
FIG. 4 is a block diagram of the one or more user devices of FIG. 1, according to an exemplary embodiment.

As shown in FIG. 4, the user device 200 includes a processing circuit 202, a first transceiver 222, a second transceiver 224, a user interface 226, and a location determination circuit 228. The processing circuit 202 has a processor 204, a memory 206, and a timer 220. The processing circuit 202 may include a general-purpose processor, an ASIC, one or more FPGAs, a DSP, circuits containing one or more processing components, circuitry for supporting a microprocessor, a group of processing components, or other suitable electronic processing components. In some embodiments, the processor 204 is configured to execute computer code stored in the memory 206 to facilitate the activities described herein. The memory 206 may be any volatile or non-volatile computer-readable storage medium capable of storing data or computer code relating to the activities described herein. According to an exemplary embodiment, the memory 206 includes computer code modules (e.g., executable code, object code, source code, script code, machine code, etc.) configured for execution by the processor 204. The timer 220 is configured to maintain a time value for the user device 200. For example, the timer 220 may be the clock of the processor 204 or may be any other time keeping circuit of the user device 200. The time value maintained by the timer 220 may be used in secured communications (e.g., in syncing time with the locking systems 300, in providing timestamps related to events for logging purposes, etc.).

According to an exemplary embodiment, (i) the first transceiver 222 is configured to facilitate communication between the user device 200 and the server 100 using a first communication protocol and (ii) the second transceiver 224 is configured to facilitate communication between the user device 200 and the locking systems 300 using a second communication protocol. In some embodiments, the first communication protocol and the second communication protocol are different. By way of example, the first communication protocol may be a long-range communication protocol and the second communication protocol may be a short-range communication protocol. In an alternative embodiment, the user device 200 communicates with the server 100 and the locking systems 300 using the same transceiver (e.g., only the first transceiver 222). In one embodiment, the first transceiver 222 includes cellular components for communicating with the server 100 via a cellular network. In another embodiment, the first transceiver 222 includes wired or wireless (e.g., Wi-Fi) components for communicating with the server 100 over the Internet or other network. In one embodiment, the second transceiver 224 includes Bluetooth components for establishing a Bluetooth connection with the locking systems 300. In another embodiment, the second transceiver 224 includes a different type of components that facilitate a different type of short-range and/or wireless communication protocol (e.g., radiofrequency, RFID, Wi-Fi, Bluetooth, ZigBee, NFC, etc.).

The user interface 226 may include a display screen and/or one or more user input devices (e.g., touch screens, buttons, microphones, speakers, displays, keyboards, stylus inputs, mice, track pads, etc.) to allow a user to interact with the user device 200, the server 100, the locking systems 300, and/or any apps running on the user device 200. The location determination circuit 228 (e.g., a global positioning system ("GPS") receiver) may be configured to generate and facilitate providing a location of the user device 200 (e.g., the current location 150) and/or the current location of a respective locking system 300 (e.g., the first location data, the second location data, etc.) to the server 100 to perform the geofencing operations disclosed herein.

According to an exemplary embodiment, the memory 206 of the user device 200 includes various modules configured to receive, manage, and transmit the encrypted user profiles. As shown in FIG. 4, the memory 206 of the user device 200 includes an application module 208 having a location module 210, a profile management module 212, a user input module 214, a locking system module 216, and a command module 218. According to an exemplary embodiment, the location module 210 is configured to (i) receive the first location data from the location determination circuit 228 regarding the current location 150 of the user device 200 and (ii) provide the first location data to the first transceiver 222 to transmit to the server 100. In some embodiments, the location module 210 is configured to (i) receive the second location data from the location determination circuit 228 regarding the current location of a respective locking system 300 that the user device 200 is accessing or attempting to access and (ii) provide the second location data to the first transceiver 222 to transmit to the server 100. In other embodiments, the location module 210 is configured to (i) receive the second location data from the locking systems 300 (e.g., in an audit trail) via the second transceiver 224 regarding the current location of a respective locking system 300 accessed by the user device 200 and (ii) provide the second location data to the first transceiver 222 to transmit to the server 100.

The profile management module 212 is configured to receive and store the encrypted user profiles and user keys sent to the first transceiver 222 of the user device 200 by the server 100 in accordance with one or more of the profile delivery protocols disclosed herein. The profile management module 212 is further configured to drop (e.g., erase, delete, remove, etc.) the encrypted user profiles and user keys in accordance with one or more of the profile delivery protocols disclosed herein. The user input module 214 is configured to (i) provide various graphical user interfaces on a display of the user interface 226 and (ii) receive inputs provided to the user interface 226 by the user and perform functions associated therewith. The locking system module 216 is configured to identify a respective locking system 300 that the user device 200 is trying to access (e.g., based on an identifier broadcasted by the respective locking system 300) and provide the corresponding encrypted user profile (e.g., without the appended user key, with the handshake nonce appended, etc.) stored in the profile management module 212 to the second transceiver 224 to deliver the encrypted user profile to the respective locking system 300 to facilitate controlling various functions of the respective locking system 300 (e.g., unlock, lock, change settings, update firmware, etc.).

The command module 218 is configured to generate and transmit an encrypted command to the respective locking system 300. The encrypted command may include a command for the respective locking system 300 to perform some action such as unlock, lock, change settings, update firmware, etc. According to an exemplary embodiment, the command is encrypted using the user key associated with the user profile that was transmitted to the respective locking system 300 at the start of the communication session. In some embodiments, the command module 218 is configured to generate a modified reply nonce based on a reply nonce received from the respective locking system 300 as described in more detail herein (e.g., in response to the respective locking system 300 successfully decrypting the encrypted user profile, etc.). In such embodiments, the command module 218 is configured to encrypt the command using both the user key and the modified reply nonce.

Figure 5:
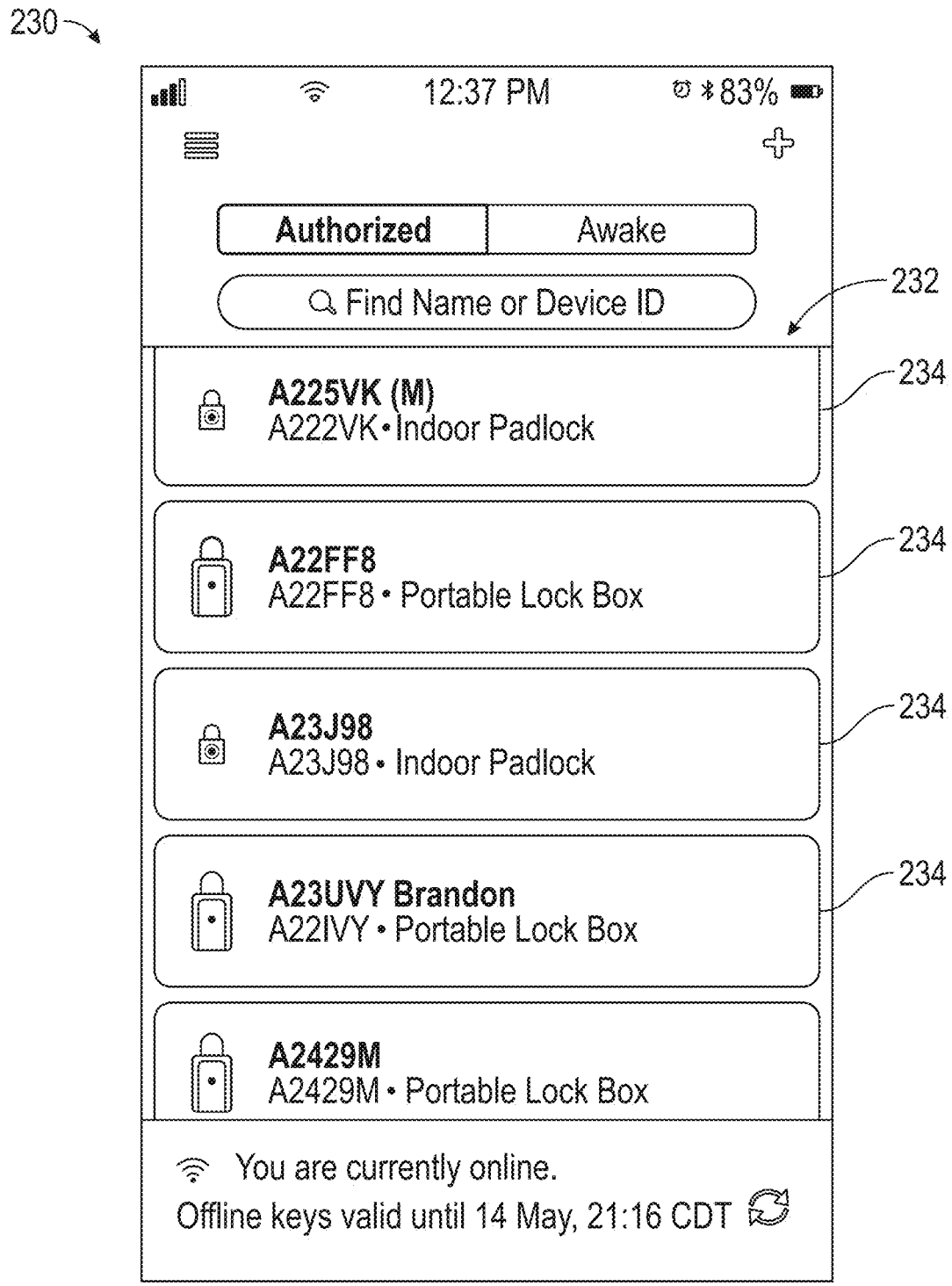
FIG. 5 is a first graphical user interface provided by the one or more user devices of FIG. 4, according to an exemplary embodiment.

As shown in FIG. 5, a first graphical user interface provided by the user interface 226 of the user device 200, shown as profile listing interface 230, includes a listing, shown as profile list 232, having one or more encrypted user profiles, shown as profiles 234. The profile list 232 includes the profiles 234 currently stored in the profile management module 212 (e.g., the profiles 234 that were delivered to the user device 200 in accordance with one or more of the profile delivery protocols).

Figure 6:
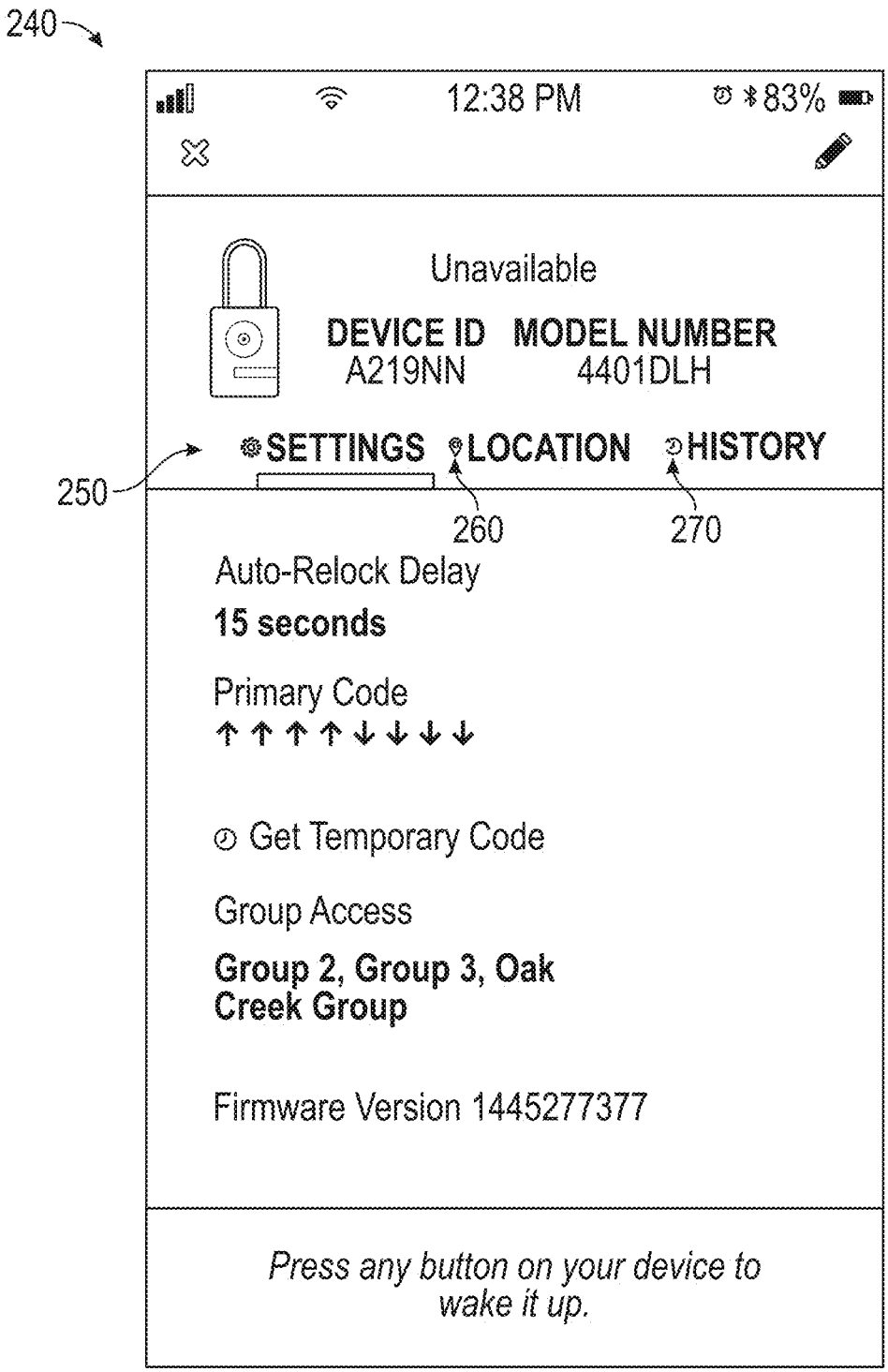
FIG. 6 is a second graphical user interface provided by the one or more user devices of FIG. 4, according to an exemplary embodiment.
Figure 7:
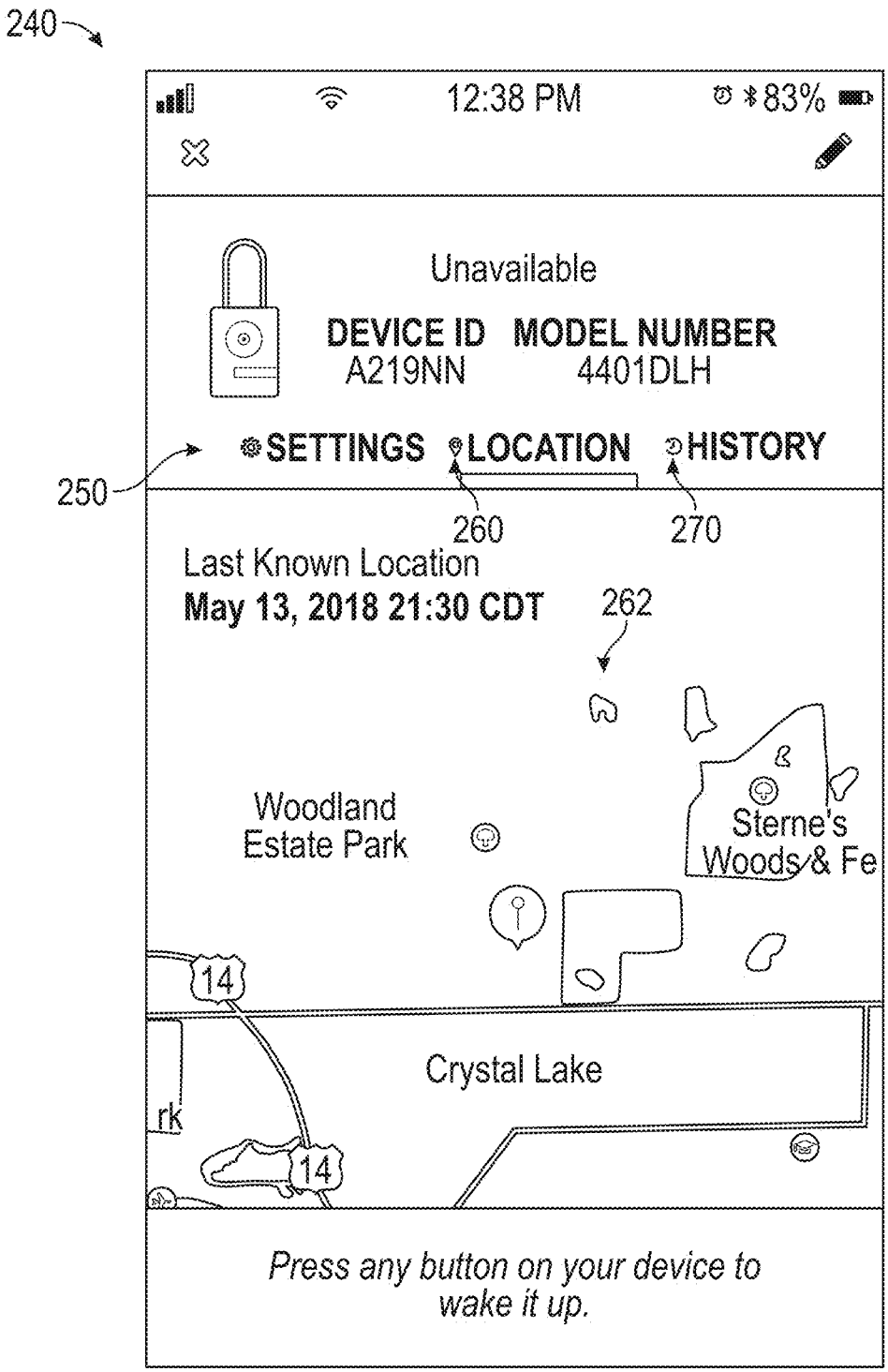
FIG. 7 is a third graphical user interface provided by the one or more user devices of FIG. 4, according to an exemplary embodiment.

As shown in FIGS. 6 and 7, a second graphical user interface provided by the user interface 226 of the user device 200, shown as locking system interface 240, displays various information regarding a respective locking system 300 that (i) the user device 200 currently has an encrypted user profile stored thereon for (e.g., in the profile management module 212, by selecting one of the profiles 234 via the profile listing interface 230, etc.) and/or (ii) that the user device 200 is currently accessing. The locking system interface 240 includes a first tab, shown as settings tab 250, a second tab, shown as location tab 260, and a third tab, shown as history tab 270.

As shown in FIG. 6, the settings tab 250 provides information regarding various settings of the respective locking system 300 such as an auto-relock delay (e.g., the time that elapses after unlocking the respective locking system 300 before the respective locking system 300 relocks if it has not been physically opened/unlocked), a code for the respective locking system 300 that may be manually entered into an interface of the respective locking system 300 to perform unlock and/or lock functions, an identification of the users or groups of users that may access the respective locking system 300, and a current firmware version of the respective locking system. The settings tab 250 may also facilitate changing the settings of the respective locking system 300 (e.g., if the respective user has permission to change the settings). As shown in FIG. 7, the location tab 260 provides information and a mapping interface 262 regarding a last known location of the respective locking system 300. According to an exemplary embodiment, the history tab 270 provides information regarding history of the respective locking system 300 (e.g., an audit history; the times at which the locking system 300 was locked, unlocked, updated, etc.; who has accessed the locking system 300; etc.).

Locking System

In general, the locking system 300 is configured to receive an encrypted user profile from a respective user device 200 and make an access and/or a management control decision based on the encrypted user profile (e.g., whether to permit unlocking, updating, etc. by the respective user device 200). In one embodiment, the locking system 300 is an electronic padlock, such as an electronic combination or keypad padlock. In other embodiments, the locking system 300 may be or include, without limitation, devices such as an electronic door lock or keypad device (e.g., a keypad deadbolt), an electronic safe (e.g., a small document safe, an electronic key safe, etc.), an electronic rim or mortise lock or other type of cabinet lock, an electronic auto accessory lock (e.g., a coupler lock, a hitch pin lock, a trailer lock, etc.) and/or a steering wheel or door lock for an automobile, a vehicle lock (e.g., a wheel lock, an ignition lock, etc.) for other motorized or non-motorized vehicles such as a bicycle, a motorcycle, a scooter, an ATV, and/or a snowmobile, a storage chest, a case with an electronic lock (e.g., a document case, a case for small valuables, etc.), an electronic cable lock (e.g., a cable lock enabled with an alarm, such as for securing a computing device, etc.), a lockout-tagout device for securing access (e.g., for securing an electrical control box while electrical work is being performed, etc.), a locker with an electronic lock, and/or an electronic luggage lock.

Figure 8:
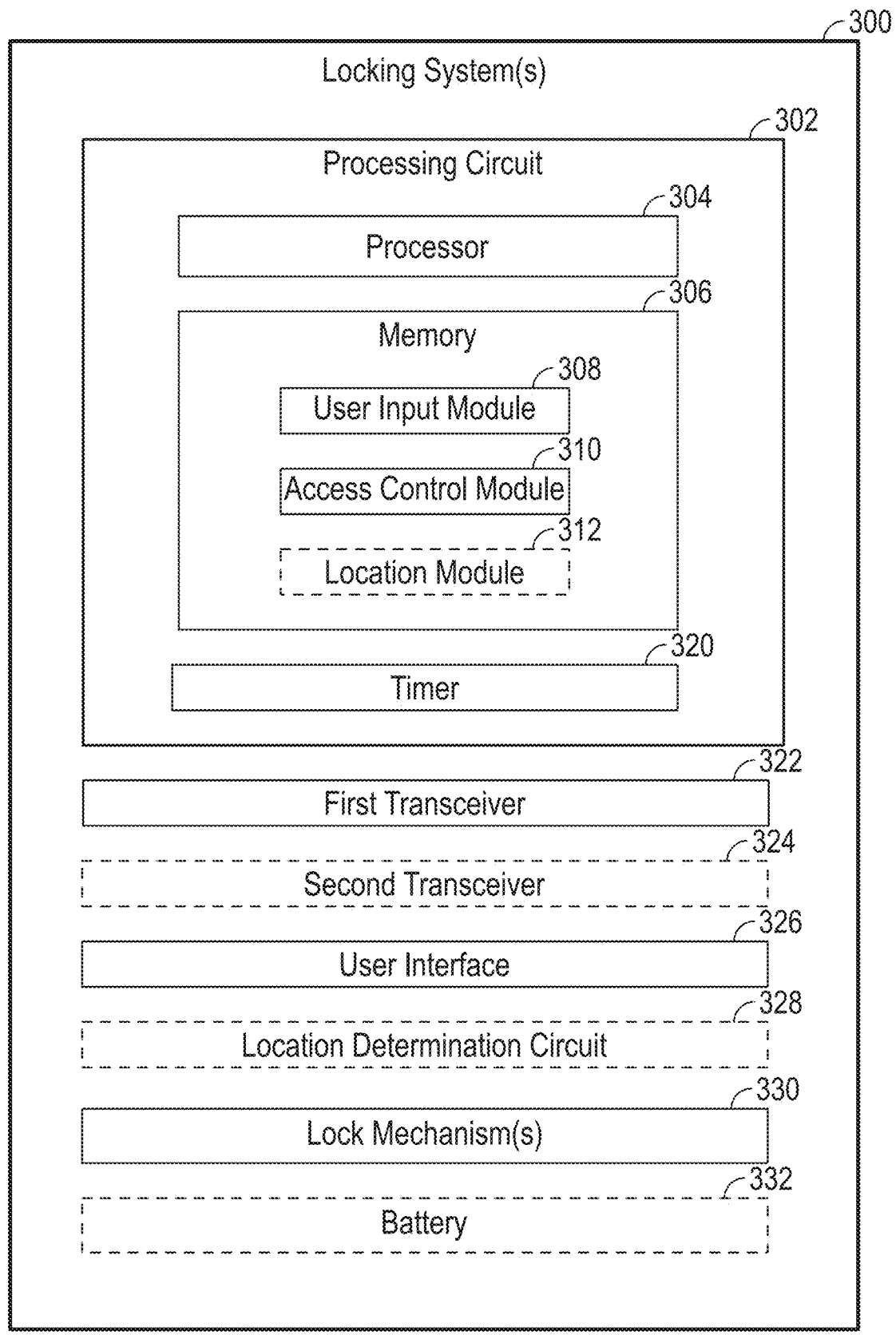
FIG. 8 is a block diagram of the one or more locking systems of FIG. 1, according to an exemplary embodiment.

As shown in FIG. 8, the locking system 300 includes a processing circuit 302, a first transceiver 322, a second transceiver 324, a user interface 326, a location determination circuit 328, lock mechanisms 330, and a battery 332. In some embodiments, the locking system 300 does not include the second transceiver 324, the location determination circuit 328, and/or the battery 332. The processing circuit 302 has a processor 304, a memory 306, and a timer 320. The processing circuit 302 may include a general-purpose processor, an ASIC, one or more FPGAs, a DSP, circuits containing one or more processing components, circuitry for supporting a microprocessor, a group of processing components, or other suitable electronic processing components. In some embodiments, the processor 304 is configured to execute computer code stored in the memory 306 to facilitate the activities described herein. The memory 306 may be any volatile or non-volatile computer-readable storage medium capable of storing data or computer code relating to the activities described herein. According to an exemplary embodiment, the memory 306 includes computer code modules (e.g., executable code, object code, source code, script code, machine code, etc.) configured for execution by the processor 304. The timer 320 is configured to maintain a time value for the locking system 300. For example, the timer 320 may be the clock of the processor 304 or may be any other time keeping circuit of the locking system 300. The time value maintained by the timer 320 may be used in secured communications (e.g., in syncing time with the user devices 200, in providing timestamps related to events for logging purposes, etc.).

According to an exemplary embodiment, the first transceiver 322 is configured to facilitate communication between the locking system 300 and the user devices 200 using a first communication protocol. By way of example, the first communication protocol may be a short-range communication protocol. In one embodiment, the first transceiver 322 includes Bluetooth components for establishing a Bluetooth connection with the second transceiver 224 of the user devices 200. In another embodiment, the first transceiver 322 includes a different type of components that facilitate a different type of short-range and/or wireless communication protocol (e.g., radiofrequency, RFID, Wi-Fi, Bluetooth, ZigBee, NFC, etc.). In embodiments where the locking system 300 includes the second transceiver 324, the second transceiver 224 is configured to facilitate direct communication between the locking system 300 and the server 100 using a second communication protocol. By way of example, the second communication protocol may be a long-range communication protocol. In an alternative embodiment, the locking system 300 communicates with the server 100 and the user devices 200 using the same transceiver (e.g., only the first transceiver 322, via Wi-Fi, etc.). In one embodiment, the second transceiver 324 includes cellular components for communicating with the server 100 via a cellular network. In another embodiment, the second transceiver 324 includes wired or wireless (e.g., Wi-Fi) components for communicating with the server 100 over the Internet or other network. In other embodiments, the locking system 300 is hardwired to a network (e.g., in an access control system implementation, etc.).

The user interface 326 may include a display screen and/or one or more user input devices (e.g., touch screens, buttons, microphones, speakers, displays, a keypad, a directional pad, etc.) to allow a user to interact with the locking system 300. By way of an example, the user interface 326 may facilitate waking the locking system 300 from a sleep mode. By way of another example, the user interface 326 may facilitate manually entering an unlock combination. In embodiments that include the location determination circuit 328, the location determination circuit 328 (e.g., a global positioning system ("GPS") receiver) may be configured to generate and facilitate providing a current location of the locking system 300 (e.g., the second location data) to the user devices 200 (e.g., via the first transceiver 322) and/or directly to the server 100 (e.g., via the second transceiver 324) to perform the geofencing operations disclosed herein.

The lock mechanism(s) 330 may include one or more physical and/or electronic locking mechanisms (e.g., pins, shackles, dials, buttons, shafts, keyholes, motors, latches, deadbolts, etc.). In embodiments that include the battery 332, the battery 332 is configured to provide power to the locking system 300 to facilitate the operation thereof (e.g., locking, unlocking, etc.). The battery 332 may be rechargeable and/or replaceable. Such a battery operated locking system 300 may therefore be portable. In embodiments that do not include the battery 332, the locking system 300 may couple to another power source to facilitate the operation thereof (e.g., hardwired to a mains power supply, coupled to an external power source, etc.). Such a locking system 300 may be a fixed installation. In some embodiments, the locking system 300 includes an input/output port (e.g., a USB port, a COM port, a networking port, etc.) that may be used to establish a physical connection to another device. For example, such a physical connection may be used by a manufacturer to program or otherwise communicate with the locking system 300.

According to an exemplary embodiment, the memory 306 of the locking system 300 includes various modules configured to make access control decisions. As shown in FIG. 8, the memory 306 of the locking system 300 includes a user input module 308, an access control module 310, and a location module 312. In some embodiments, the memory 306 does not include the location module 312 (e.g., in embodiments where the locking system 300 does not include the location determination circuit 328, etc.).

The user input module 308 is configured to receive inputs through the user interface 326. By way of example, the user input module 308 may receive an input to awaken the locking system from a sleep mode. By way of another example, the user input module 308 may receive a manual access code to unlock or otherwise access the locking system 300. By way of another example, the user input module 308 may receive an encrypted user profile from a respective user device 200.

The access control module 310 is configured to store a lock identifier, a lock key, and/or a manual access code for the locking system 300. The access control module 310 may be configured to broadcast the lock identifier via the first transceiver 322 (e.g., in response to being awoken from a sleep mode, etc.). In response to the broadcast, the locking system 300 may receive an associated encrypted user profile from a respective user device 200. The access control module 310 is configured to decrypt the encrypted user profile using (i) the lock key pre-stored thereon and/or (ii) the handshake nonce appended to the encrypted user profile (in embodiments where the handshake nonce is used) to obtain a user key from the decrypted user profile. In some embodiments, the access control module 310 is configured to generate and transmits a reply nonce to the respective user device 200 via the first transceiver 322 in response to successfully decrypting the encrypted user profile.

The access control module 310 may receive an encrypted command from the respective user device 200 (e.g., after successfully decrypting the encrypted user profile, etc.) via the first transceiver 322. The access control module 310 is configured to decrypt the encrypted command using the user key obtained from the decrypted user profile. In some embodiments, the access control module 310 is configured to generate a modified reply nonce based on the reply nonce to decrypt the encrypted command along with the user key (in embodiments where the access control module 310 generates and transmits the reply nonce to the user device 200 and the user device 200 generates and encrypts the command with the user key and the modified reply nonce). The access control module 310 is configured to initiate an action specified by the decrypted command (e.g., unlocking a physical locking component, implementing a firmware update, update a setting thereof, etc.) in response to successfully decrypting the encrypted command.

According to an exemplary embodiment, the access control module 310 is configured to perform the decryption of the encrypted user profile and the encrypted command using a single decryption algorithm. By way of example, the decryption algorithm may be or include a Counter with Cipher Block Chaining-Message Authentication Code ("CCM") algorithm as described in further detail in *Recommendation for Block Cipher Modes of Operation: the CCM Mode for Authentication and Confidentiality* published by the National Institute of Standards and Technology in May 2004 and authored by Morris Dworkin, which is incorporated herein by reference in its entirety.

In some embodiments, the two key authentication scheme using the lock key and the user key eliminates any need to pair (e.g., using Bluetooth pairing, etc.) the locking systems 300 to the user devices 200 to create a secure communication session between the locking systems 300 and the user devices 200. In such embodiments, the locking systems 300, therefore, do not store the user keys received from the user devices 200 after a communication session between the locking systems 300 and the user devices 200 ends (e.g., after implementing the command, due to the inability to decrypt the encrypted command, in response to a lack of receiving an encrypted command for a predefined period of time, etc.).

It should be understood that the two key authentication scheme implemented by the access control module 310 described herein is not meant to be limiting, but is provided as an example of one possible way to provide secure communication between the user devices 200 and the locking systems 300. In other embodiments, secure communication is otherwise established by the access control module 310 using a different authentication scheme such as an authentication scheme that employs digital signatures, challenge-response procedures, multi-factor authentication (e.g., two-factor authentication, user profile plus a biometric, a user profile plus a PIN, etc.), and/or still other suitable authentication schemes.

In embodiments where the locking system 300 includes the location determination circuit 328 and does not include the second transceiver 324, the location module 312 is configured to (i) receive the second location data from the location determination circuit 328 regarding the current location of the locking system 300 and (ii) provide the second location data to the first transceiver 322 to transmit to a respective user device 200 (which, in turn, is provided to the server 100 by the respective user device 200). In embodiments where the locking system 300 includes the location determination circuit 328 and the second transceiver 324, the location module 312 is configured to (i) receive the second location data from the location determination circuit 328 regarding the current location of the locking system 300 and (ii) provide the second location data to the second transceiver 324 to transmit directly to the server 100. In embodiments where the locking system 300 does not include the location determination circuit 328 or the second transceiver 324, the location module 312 may be configured to store a predefined location of the locking system 300 (e.g., in a fixed installation implementation such as in an access control system, etc.) and/or the user devices 200 that access the locking system 300 are configured to generate the second location data as described in further detail herein.

Figure 9:
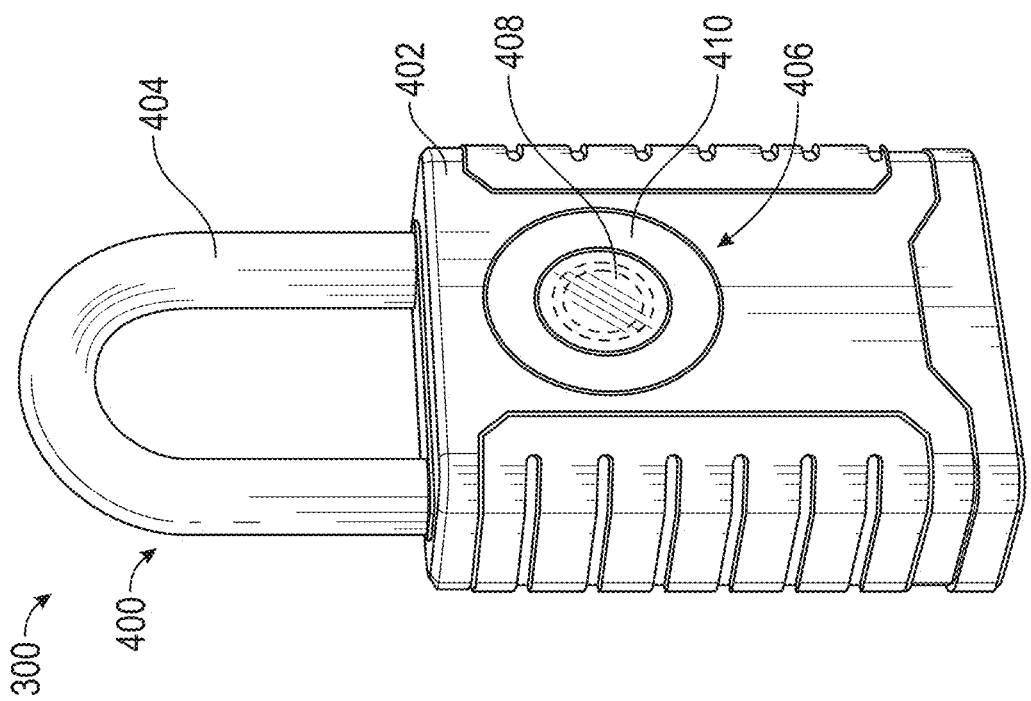
FIG. 9 is a perspective view of a first locking system of the one or more locking systems of FIG. 8, according to an exemplary embodiment.

As shown in FIG. 9, the locking system 300 is configured as a first locking system, shown as electronic padlock 400. The electronic padlock 400 includes a housing, shown as housing 402, a locking mechanism (e.g., the lock mechanisms 330, etc.), shown as shackle 404, and an interface (e.g., the user interface 326, etc.), shown as user interface 406. According to the exemplary embodiment shown in FIG. 9, the user interface 406 includes a sensor, shown as touch sensor 408, configured to awaken the electronic padlock 400 in response to a user's touch and a directional pad, shown as D-pad 410, configured to facilitate entering a manual code (e.g., an unlock code, etc.). In some embodiments, the sensor of the user interface 406 additionally or alternatively includes a proximity sensor and/or a microphone configured to awaken the electronic padlock 400 in response to detecting a nearby user. In another embodiment, the user interface 406 includes a mechanical dial or a keypad configured to allow a user to enter a manual code and/or a keyway configured to receive a key (e.g., to unlock the shackle 404, etc.).

Figure 10:
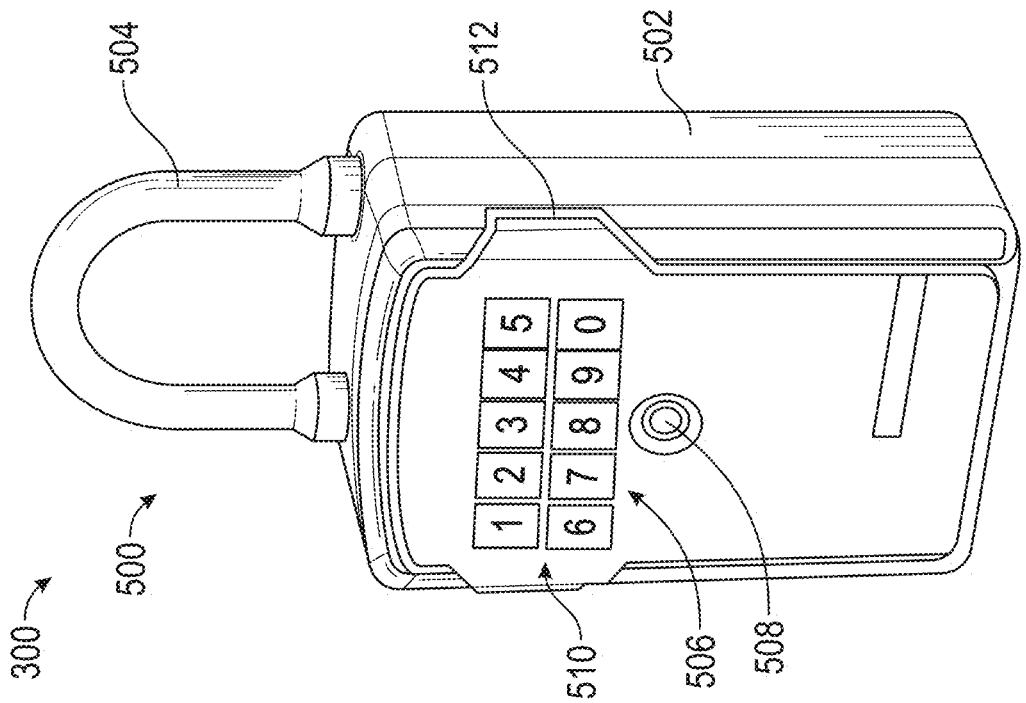
FIG. 10 is a perspective view of a second locking system of the one or more locking systems of FIG. 8, according to an exemplary embodiment.

As shown in FIG. 10, the locking system 300 is configured as a second locking system, shown as electronic key safe 500. The electronic key safe 500 includes a housing, shown as housing 502, a locking mechanism (e.g., the lock mechanisms 330, etc.), shown as shackle 504, an interface (e.g., the user interface 326, etc.), shown as user interface 506, and a pivotal door, shown as door 512. According to the exemplary embodiment shown in FIG. 10, the user interface 506 includes a sensor, shown as touch sensor 508, configured to awaken the electronic key safe 500 in response to a user's touch and a key pad, shown as number pad 510, configured to facilitate entering a manual code (e.g., an unlock code, etc.). In some embodiments, the sensor of the user interface 506 additionally or alternatively includes a proximity sensor and/or a microphone configured to awaken the electronic key safe 500 in response to detecting a nearby user. In another embodiment, the user interface 506 includes a mechanical dial or a D-pad configured to allow a user to enter a manual code and/or a keyway configured to receive a key (e.g., to unlock the shackle 504, the door 512, etc.). According to an exemplary embodiment, the door 512 is pivotally coupled to the housing 502 to facilitate selectively exposing an internal cavity of the housing 502 (e.g., configured to store a set of keys, etc.).

Figure 11:
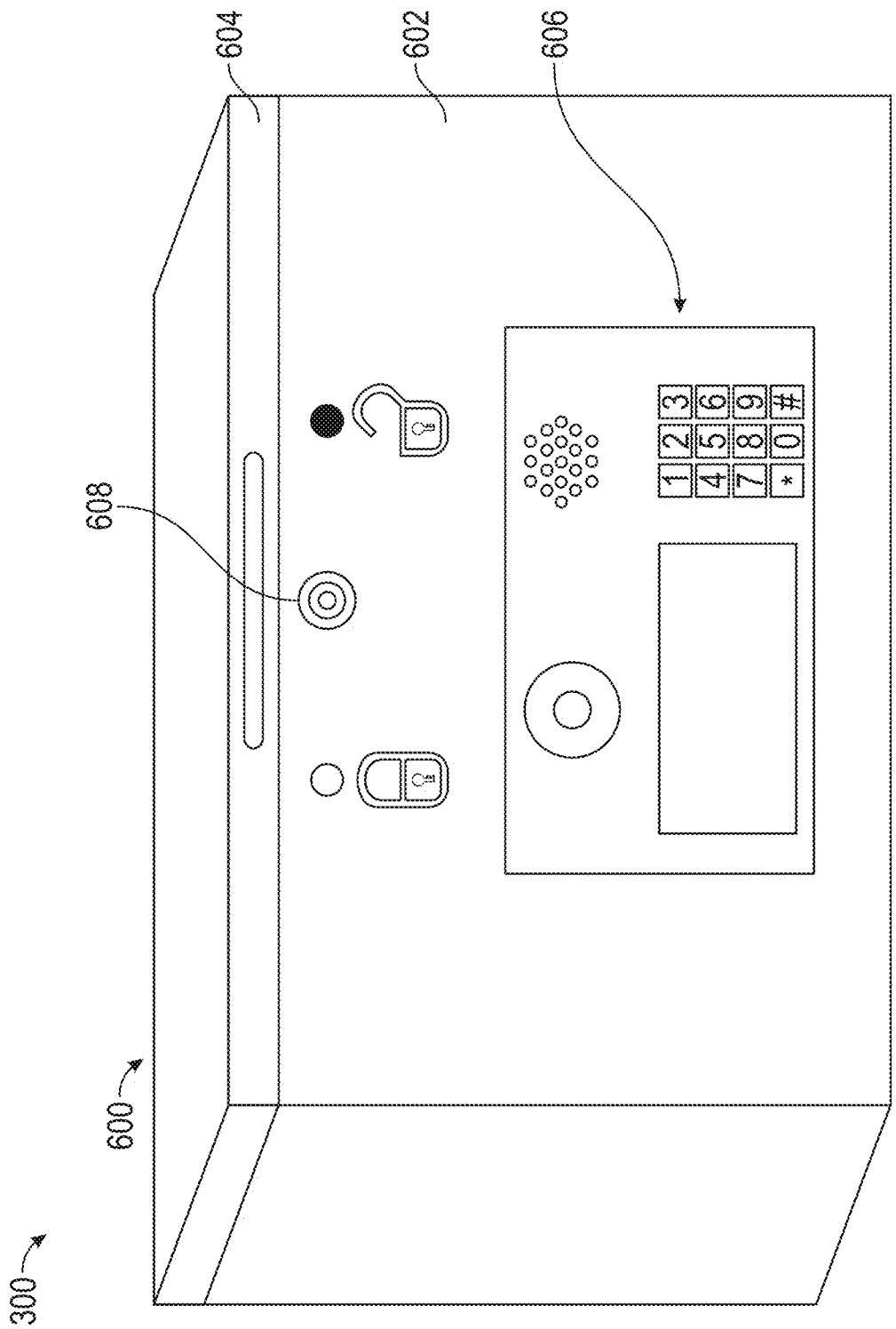
FIG. 11 is a perspective view of a third locking system of the one or more locking systems of FIG. 8, according to an exemplary embodiment.

As shown in FIG. 11, the locking system 300 is configured as a third locking system (e.g., a lock box, a locker, etc.), shown as electronic lock box 600. The electronic lock box 600 includes a housing, shown as housing 602, a door, shown as lid 604, an interface (e.g., the user interface 326, etc.), shown as user interface 606, and a sensor, shown as sensor 608. According to an exemplary embodiment, the lid 604 is pivotally coupled to and selectively secured to (e.g., by a locking mechanism, etc.) the housing 602 to facilitate selectively exposing an internal cavity of the housing 602. In one embodiment, the user interface 606 includes a key pad or other component configured to facilitate entering a manual code (e.g., an unlock code, etc.), a microphone, a display screen, etc. In another embodiment, the user interface 606 includes a mechanical dial or a d-pad configured to allow a user to enter a manual code and/or a keyway configured to receive a key (e.g., to unlock the lid 604, etc.). In one embodiment, the sensor 608 is or includes a proximity sensor and/or camera device configured to awaken the electronic lock box 600 in response to detecting a nearby user. Further details regarding the electronic lock box 600 may be found in U.S. Pat. No. 10,205,913, filed Sep. 14, 2015, which is incorporated herein by reference in its entirety.

Figure 12:
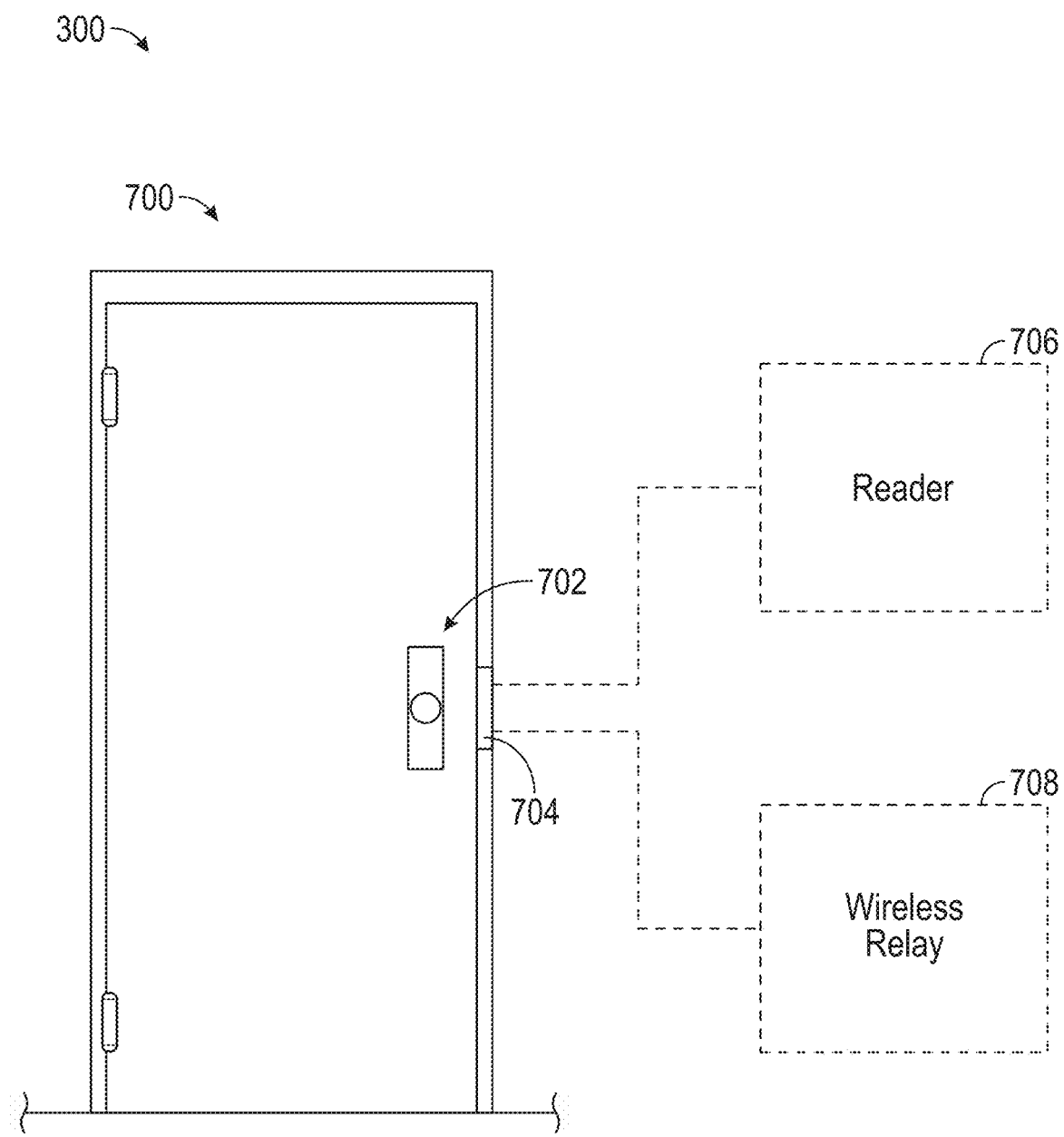
FIG. 12 is a schematic view of a fourth locking system of the one or more locking systems of FIG. 8, according to an exemplary embodiment.

As shown in FIG. 12, the locking system 300 is configured as a fourth locking system, shown as electronic door lock system 700. The electronic door lock system 700 includes a door lock, shown as electronic door lock 702, and a receiver, shown as door jamb receiver 704, configured to interface with the electronic door lock 702 (e.g., a deadbolt thereof, a retainer thereof, etc.). In one embodiment, the door jamb receiver 704 is a deadbolt receiver. In another embodiment, the door jamb receiver is an electric strike. In some embodiments, the electronic door lock 702 is a door lock having communication components (e.g., Bluetooth components, etc.) configured to facilitate communicating with the user devices 200. In some embodiments, the electronic door lock 702 is part of a building access control system. In such an embodiment, the electronic door lock system 700 may further include an independent reader (e.g., a card reader, a fob reader, a credential reader, etc.), shown as reader 706, that is hardwired to the electronic door lock 702 and configured to make the access control decisions. The reader 706 may include the various components of the processing circuit 302 of the locking systems 300. In some embodiments, the electronic door lock 702 does not have communication components configured to facilitate communicating with the user devices 200. In such an embodiment, the electronic door lock system 700 may further include an external wireless transceiver (e.g., a BLE relay, etc.), shown as wireless relay 708, that is configured to interface with the electronic door lock 702 to facilitate wirelessly communicating with the user devices 200. The wireless relay 708 may thereby provide a "retrofit" solution to existing door locks that do not have the requisite wireless communication capabilities. The wireless relay 708 may include the various components of the processing circuit 302 of the locking systems 300.

Methods

Figure 13:
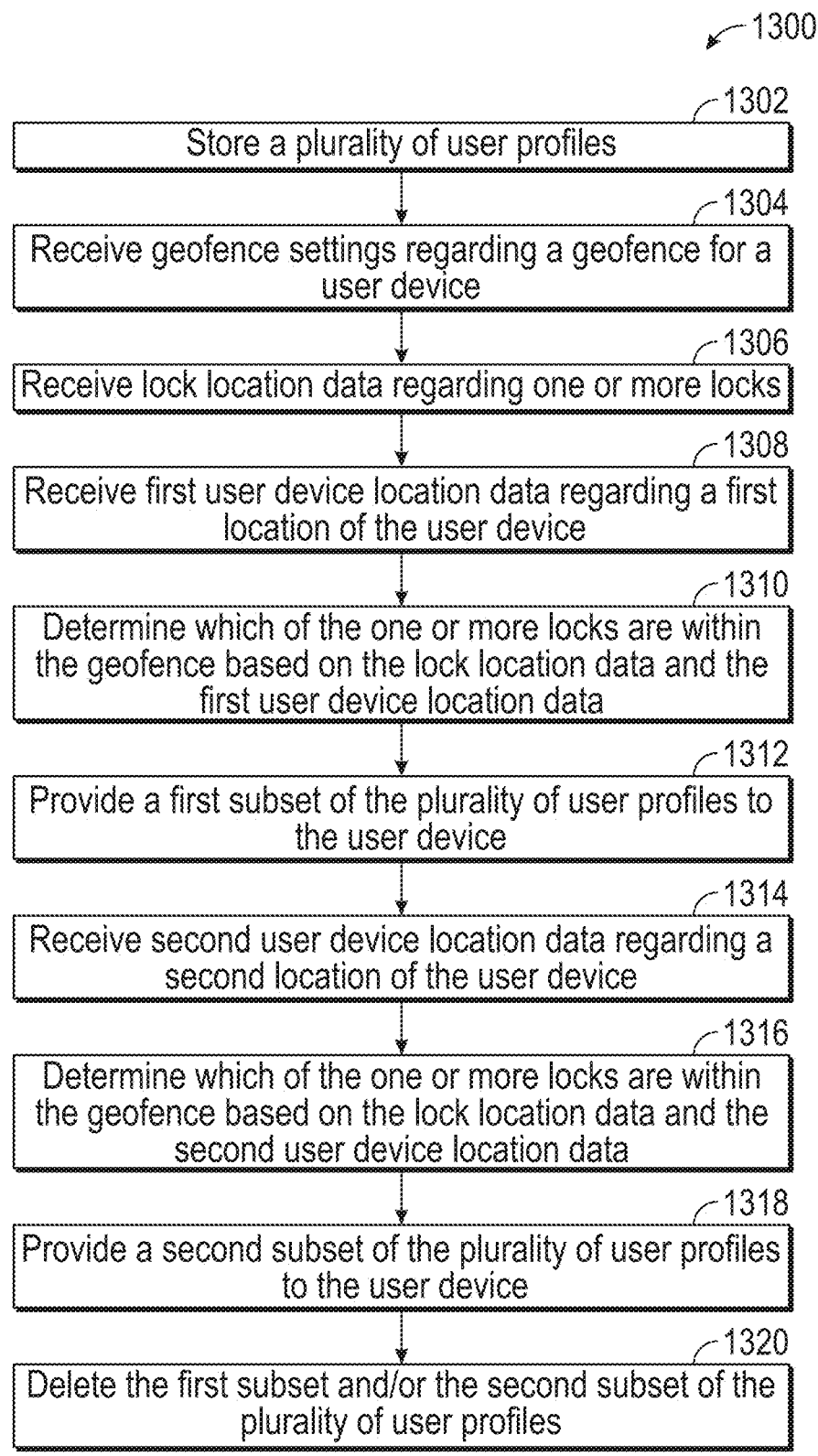
FIG. 13 is a flow diagram of a method for delivering one or more user profiles to a user device based on a proximity/geofence delivery protocol, according to an exemplary embodiment.

Referring now to FIG. 13, a method 1300 for delivering one or more user profiles to a user device (e.g., the user device 200, etc.) based on a proximity/geofence delivery protocol is shown, according to an exemplary embodiment. In alternative embodiments, fewer, additional, and/or different steps may be performed. Also, the use of a flow diagram is not meant to be limiting with respect to the order of steps performed.

At step 1302, a server (e.g., a profile management server, the server 100, etc.) is configured to store a plurality of user profiles. At step 1304, the server is configured to receive geofence setting regarding a geofence for the user device (e.g., based on a user's subscription, user selected settings, etc.). At step 1306, the server is configured to receive lock location data (e.g., the second location data, etc.) regarding the location of one or more locks. The server may receive the lock location data directly from the locks and/or indirectly via one or more user devices. The lock location data may indicate a real-time current location, a last known location, and/or a fixed location of the one or more locks.

At step 1308, the server is configured to receive first user device location data (e.g., the first location data, etc.) from the user device regarding a first location (e.g., the current location 150, etc.) of the user device. At step 1310, the sever is configured to determine which of the one or more locks are within the geofence based on the lock location data and the first user device location data (see, e.g., FIGS. 3A-3C). At step 1312, the server is configured to provide a first subset of the plurality of user profiles that correspond with the one or more locks within the geofence to the user device. Prior to providing the first subset of user profiles, the server may be configured to (i) insert an associated user key into or append the associated user key to each user profile of the first subset of the plurality of user profiles, (ii) generate a handshake nonce for each user profile of the first subset of the plurality of user profiles (in embodiments where the handshake nonce is used), (iii) encrypt each user profile and user key combination of the first subset of the plurality of user profiles using (a) a lock key for a specific lock that each user profile is associated with and/or (b) the handshake nonce (in embodiments where the handshake nonce is used) to generate encrypted user profiles, and/or (iv) append (a) the user key and/or (b) the handshake nonce (in embodiments where the handshake nonce is used) associated with each encrypted user profile to the encrypted user profiles.

At step 1314, the server is configured to receive second user device location data from the user device regarding a second location of the user device. At step 1316, the sever is configured to determine which of the one or more locks are within the geofence based on the lock location data and the second user device location data. At step 1318, the server is configured to provide a second subset of the plurality of user profiles that correspond with the one or more locks within the geofence to the user device. Prior to providing the second subset of user profiles, the server may be configured to encrypt the second subset of user profiles similarly as the first subset of user profiles. At step 1320, the server and/or the user device are configured to delete the first subset and/or the second subset of the plurality of user profiles from the user device. By way of example, the first subset of the plurality of user profiles may be deleted from the user device when the user device receives the second subset of the plurality of user profiles. By way of another example, the first subset of the plurality of user profiles and the second subset of the plurality of user profiles may remain on the user device until the end of a predefined time period (e.g., a shift of the user, during a roaming mode, etc.).

Figure 14:
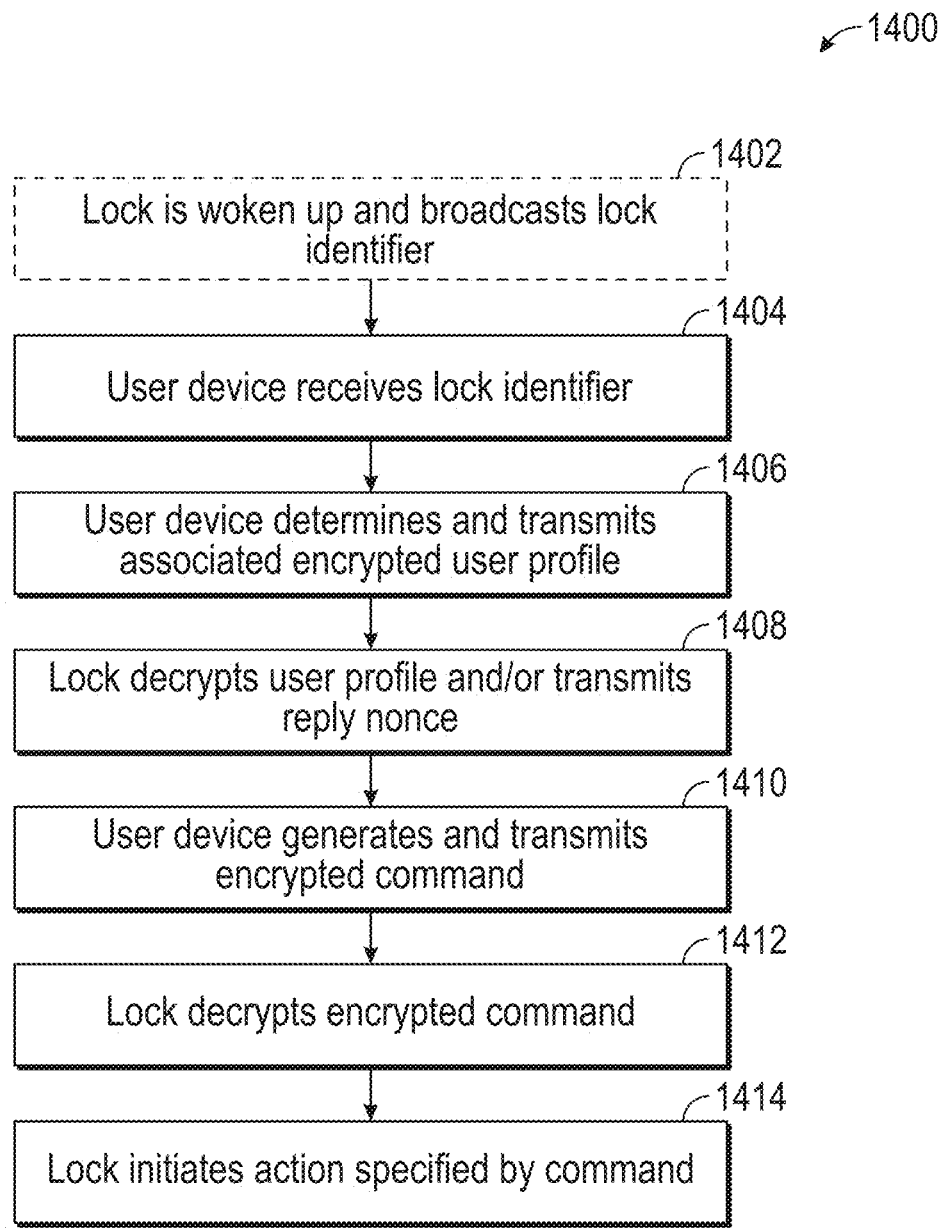
FIG. 14 is a flow diagram of a method for interacting with a locking system using a user device, according to an exemplary embodiment.

Referring now to FIG. 14, a method 1400 for interacting with a lock (e.g., the locking system 300, etc.) using a user device (e.g., the user device 200, etc.) is shown, according to an exemplary embodiment. In alternative embodiments, fewer, additional, and/or different steps may be performed. Also, the use of a flow diagram is not meant to be limiting with respect to the order of steps performed.

In some embodiments, at step 1402, the lock may be woken up out of a low power standby or sleep state. For example, the lock system may be touched by a user (e.g., a button on the lock may be pressed, etc.) or the proximity of the user may be automatically detected (e.g., using a proximity sensor, an NFC sensor, etc.). The standby/sleep state may utilize less power (e.g., battery power, etc.) than if the lock is in a fully operational, awake state. In some embodiments, the lock may always be in a fully functional state, and may not be woken up out of a standby/sleep state (e.g., if hardwired to an external power source, etc.). In some embodiments, upon waking out of the low power sleep state, the lock may broadcast or otherwise advertise a unique lock identifier associated with the lock (e.g., an identifier that is formed from its model, serial number, etc.).

At step 1404, the user device receives the lock identifier from the lock. In one embodiment, the lock identifier is compared to a set of lock identifiers stored on the user device to determine whether the user device is associated with the locking device (e.g., whether an encrypted user profile exists that corresponds to the lock identifier, etc.). For example, each encrypted user profile may have a list of lock identifiers identifying locks that the user associated with the user profile has permission to access. If an encrypted user profile is found for the lock, at step 1406, the user device transmits the encrypted user profile to the lock (e.g., including the user key encrypted therein, encrypted with the lock key and/or handshake nonce, including the handshake nonce appended thereto, etc.). In embodiments where a handshake nonce is used, the encrypted user profile may be encrypted by a server (e.g., the server 100, etc.) with a lock key (i.e., a key unknown to the user device) and the handshake nonce, with the handshake nonce also sent with the encrypted user profile (e.g., appended thereto, see step 1312, etc.).

At step 1408, the lock receives the encrypted user profile and uses a lock key pre-stored thereon to decrypt the encrypted user profile to obtain a user key from the decrypted user profile. In embodiments where the handshake nonce is sent appended to the encrypted user profile, the lock uses the lock key pre-stored thereon and the handshake nonce received with the encrypted user profile in the decryption process to obtain the user key from the decrypted user profile. In some embodiments, the lock generates and transmits a reply nonce to the user device in response to successfully decrypting the encrypted user profile.

At step 1410, the user device generates and transmits an encrypted command to the lock. According to an exemplary embodiment, the command is encrypted using the user key. In some embodiments, the user device generates a modified reply nonce based on the reply nonce received from the lock and encrypts the command using the user key and the modified reply nonce.

At step 1412, the lock decrypts the encrypted command using the user key obtained from the decrypted user profile. In embodiments where the encrypted command is encrypted with the user key and the modified reply nonce by the user device, the lock generates its own modified reply nonce based on the reply nonce and then attempts to decrypt the encrypted command using the user key obtained from the decrypted user profile and the modified reply nonce generated independently by the lock. At step 1414, the lock initiates an action specified by the decrypted command in response to successfully decrypting the encrypted command using the user key and/or the modified reply nonce (e.g., the lock can activate a physical locking component, perform a firmware update, change a lock setting, etc.).

In some embodiments, the user device and/or the lock may also ensure that the user profile for the lock provides the user access at that verified time (e.g., by referring to the scheduling information included in the user profile, etc.). In an embodiment where the user device transmits a timestamp, the lock may verify the timestamp by comparing the timestamp with a current time of the lock. In an embodiment utilizing the timestamp discussed above, a received timestamp may also be required to be within a threshold amount of time from a time maintained by the lock. In an embodiment (e.g., if permitted by user profile permissions), the timestamp from the user device may be used to synchronize or update a time of the lock. Therefore, if the user profile and command are both verified (e.g., by successful decryption and time compliance, etc.), then the lock may comply with the command of the user device and initiate a corresponding action.

Figure 15:
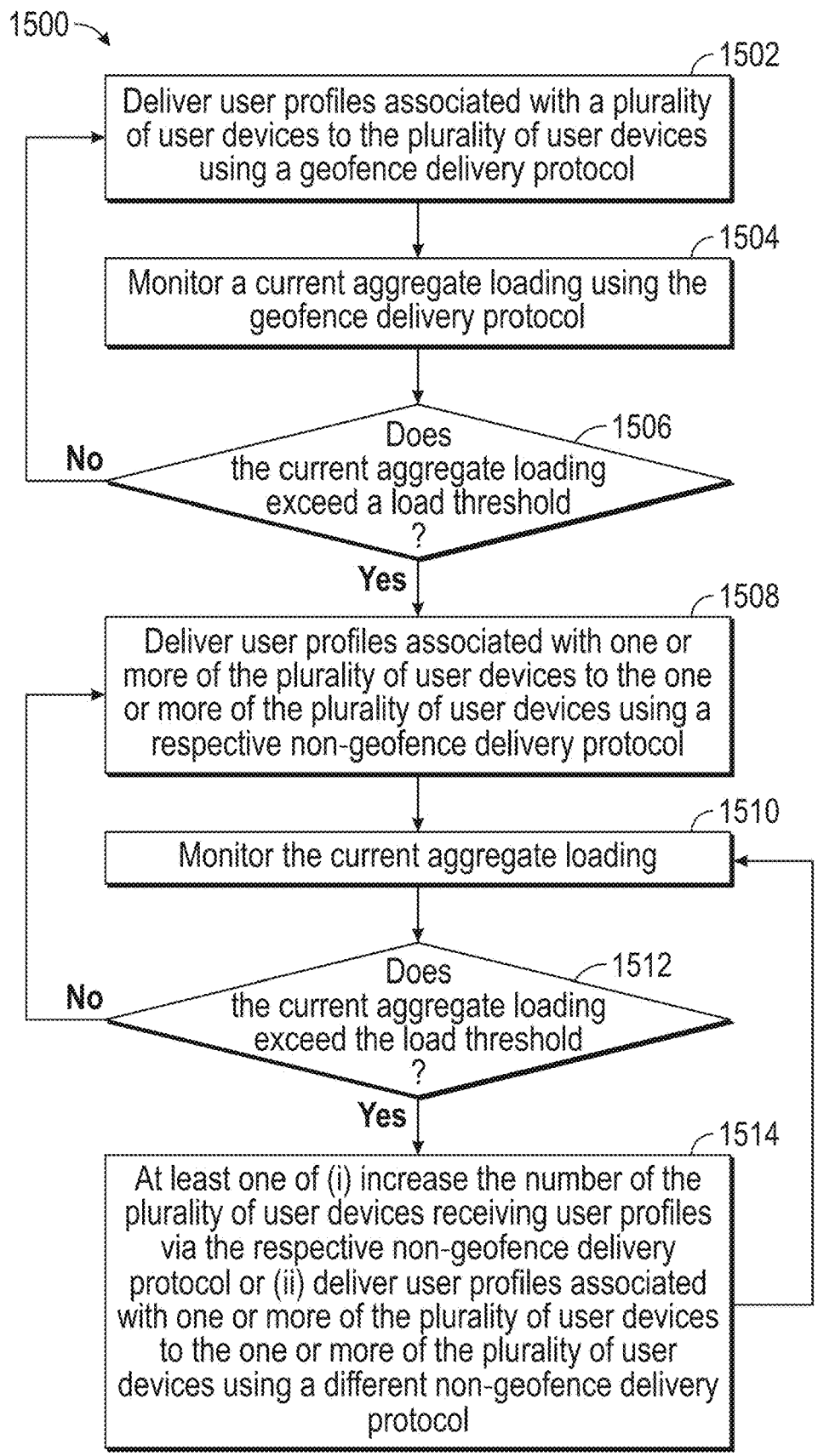
FIG. 15 is a flow diagram of a method for dynamically delivering user profiles to user devices, according to an exemplary embodiment.

Referring now to FIG. 15, a method 1500 for dynamically delivering user profiles to user devices (e.g., the user devices 200, etc.) is shown, according to an exemplary embodiment. In alternative embodiments, fewer, additional, and/or different steps may be performed. Also, the use of a flow diagram is not meant to be limiting with respect to the order of steps performed.

At step 1502, a server (e.g., a profile management server, the server 100, etc.) is configured to deliver user profiles associated with each of a plurality of user devices (e.g., the user devices 200, etc.) to the plurality of user devices using a geofence delivery protocol (see, e.g., method 1300). At step 1504, the server is configured to determine and monitor a current aggregate loading on the server as a result of delivering the user profiles to the plurality of user devices using the geofence delivery protocol. At step 1506, the server is configured to determine whether the current aggregate loading on the server is greater than a load threshold. The server is configured to repeat steps 1502-1506 and continue delivering the user profiles using the geofence delivery protocol in response to the current aggregate loading being less than the load threshold (i.e., the server is able to adequately manage the current demand). Conversely, the server is configured to proceed to step 1508 in response to the current aggregate loading exceeding the load threshold (e.g., the demand on the server is high, peak demand, etc.).

At step 1508, the server is configured to begin delivering user profiles associated with one or more of the plurality of user devices to the one or more of the plurality of user devices using a respective non-geofence delivery protocol (e.g., an awake delivery protocol, a favorites delivery protocol, a favorites key chain delivery protocol, a known offline delivery protocol, an override request delivery protocol, a key cache delivery protocol, a dynamic lifespans delivery protocol, a security slider delivery protocol, etc.) in an attempt to reduce the load on the server. The server may begin delivering the user profiles to (i) all of the user devices associated therewith or (ii) a subset of the plurality of user devices using the respective non-geofence delivery protocol (e.g., a first subset of the plurality of user devices may continue to receive the user profiles via the geofence delivery protocol and a second subset of the plurality of user devices may begin to receive the user profiles via the non-geofence delivery protocol, based on a subscription level of each of the respective users, etc.).

At step 1510, the server is configured to determine and monitor the current aggregate loading on the server as a result of delivering the user profiles to the one or more of the plurality of user devices using the non-geofence delivery protocol. At step 1512, the server is configured to determine whether the current aggregate loading on the server is greater than the load threshold. The server is configured to repeat steps 1508-1512 and continue delivering the user profiles using the non-geofence delivery protocol and/or the geofence delivery protocol (e.g., if all of the user devices are not receiving the user profiles using the non-geofence delivery protocol, etc.) in response to the current aggregate loading being less than the load threshold (i.e., the server is able to adequately manage the current demand). Conversely, the server is configured to proceed to step 1514 in response to the current aggregate loading exceeding the load threshold.

At step 1514, the server is configured to (i) increase the number of the plurality of user devices receiving the user profiles via the respective non-geofence delivery protocol (e.g., if only a subset of the plurality of user devices are currently receiving the user profiles associated therewith using the respective non-geofence delivery protocol, if a subset of the plurality of user devices are currently receiving the user profiles associated therewith using the geofence delivery protocol, etc.) and/or (ii) deliver the user profiles associated with one or more of the plurality of user devices to the one or more of the plurality of user devices using a different non-geofence delivery protocol (e.g., a second non-geofence delivery protocol, etc.). The one or more of the plurality of user devices that may receive the user profiles with the different non-geofence delivery protocol may be (i) the same user devices that were previously receiving the user profiles via the first non-geofence deliver protocol, (ii) different user devices than the user devices that continue to receive the user profiles via the first non-geofence deliver protocol, and/or (iii) a subset of the user devices that were previously receiving the user profiles via the first non-geofence deliver protocol (e.g., may be based on a subscription level, etc.). The server may then return to step 1510.

If the steps taken at step 1514 successfully reduce the current aggregate loading on the server, the server may continue to deliver the user profiles as previously implemented at step 1514. However, if the current aggregate loading again exceeds the load threshold, the server is configured to (i) increase the number of the plurality of user devices receiving the user profiles via the respective non-geofence delivery protocol (e.g., further decrease the number of user devices receiving the user profiles via the geofence delivery protocol, increase the number of user devices receiving the user profiles via the first non-geofence delivery protocol, increase the number of user devices receiving the user profiles via the second non-geofence delivery protocol, etc.) and/or (ii) deliver the user profiles associated with one or more of the plurality of user devices to the one or more of the plurality of user devices using another different non-geofence delivery protocol (e.g., a third non-geofence delivery protocol, etc.). The process in steps 1508-1514 may be repeated while the loading on the server exceeds the load threshold. When the loading decreases, the server may return to step 1502 or gradually increase the number of user devices that receive the user profiles according to the geofence delivery protocol (e.g., as permitted by the current demand on the server, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the user profile management system 10 and the components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A lock system comprising:
a processing circuit configured to:
store an access credential for a locking device, the access credential associated with a user, the access credential having a lifespan;
deliver the access credential to a user device associated with the user to facilitate accessing the locking device with the user device;
monitor a frequency at which the user device accesses the locking device using the access credential; and
adjust the lifespan of the access credential based on the frequency;
wherein the processing circuit is configured to increase the lifespan for the access credential in response to the user device accessing the locking device more frequently and decrease the lifespan for the access credential in response to the user device accessing the locking device less frequently; and
wherein increasing the lifespan permits the access credential to remain active and stored offline on the user device for a longer duration of time.

2. The lock system of claim 1, wherein the processing circuit is configured to:
store a plurality of access credentials associated with the user and associated with a plurality of locking devices, the plurality of access credentials including the access credential;
deliver one or more of the plurality of access credentials to the user device according to a first delivery protocol;
monitor a current loading on the processing circuit; and
deliver one or more of the plurality of access credentials to the user device according to a second delivery protocol different than the first delivery protocol in response to the current loading on the circuit exceeding a load threshold.

3. The lock system of claim 2, further comprising the plurality of locking devices.

4. The lock system of claim 3, wherein at least one of the plurality of locking devices is disconnected from and unable to directly communicate with the processing circuit.

5. The lock system of claim 2, wherein at least one of the plurality of locking devices is configured to:
receive a respective access credential from the user device; and
decide to initiate an access control session with the user device independent of the processing circuit based on the respective access credential received from the user device.

6. The lock system of claim 2, wherein the first delivery protocol is a geofence delivery protocol and the second delivery protocol is a non-geofence delivery protocol.

7. The lock system of claim 2, wherein the first delivery protocol is a first non-geofence delivery protocol and the second delivery protocol is a second non-geofence delivery protocol.

8. The lock system of claim 1, wherein the access credential is a first access credential, the locking device is a first locking device, the user device is a first user device, and the user is a first user, and wherein the processing circuit is configured to:
store a second access credential for a second locking device, the second access credential associated with a second user;
monitor a current loading on the processing circuit;
deliver the first access credential to the first user device and the second access credential to a second user device according to a first delivery protocol in response to the current loading being less than a load threshold; and
deliver the first access credential to the first user device according to a second delivery protocol and the second access credential to the second user device according to the first delivery protocol in response to the current loading exceeding the load threshold.

9. The lock system of claim 8, wherein the first user has a different permission level than the second user.

10. The lock system of claim 8, wherein the first user has a different subscription level than the second user.

11. The lock system of claim 8, wherein the first delivery protocol is a geofence delivery protocol and the second delivery protocol is a non-geofence delivery protocol.

12. The lock system of claim 8, wherein the first delivery protocol is a first non-geofence delivery protocol and the second delivery protocol is a second non-geofence delivery protocol.

13. The lock system of claim 1, wherein:
the access credential is a first access credential, the lifespan is a first lifespan, and the locking device is a first locking device;
the processing circuit is configured to:
store a second access credential for a second locking device, the second access credential associated with the user, the second access credential having a second lifespan; and
deliver the second access credential to the user device associated with the user to facilitate accessing the second locking device with the user device; and
the first lifespan is different than the second lifespan.

14. A method comprising:
- storing, by a processing circuit, an access credential for a locking device, the access credential associated with a user, the access credential having a lifespan;
- delivering, by the processing circuit, the access credential to a user device associated with the user to facilitate accessing the locking device with the user device;
- monitoring, by the processing circuit, a frequency at which the user device accesses the locking device using the access credential; and
- adjusting, by the processing circuit, the lifespan of the access credential based on the frequency;
- wherein adjusting the lifespan includes increasing the lifespan for the access credential in response to the user device accessing the locking device more frequently and decreasing the lifespan for the access credential in response to the user device accessing the locking device less frequently; and
- wherein increasing the lifespan permits the access credential to remain active and stored offline on the user device for a longer duration of time.

\* \* \* \* \*